United States Patent [19]
Koike et al.

[11] Patent Number: 5,216,649
[45] Date of Patent: Jun. 1, 1993

[54] OPTICAL HEAD WITH A TILT CORRECTION SERVO MECHANISM

[75] Inventors: Manabu Koike; Shinsuke Shikama; Eiichi Toide; Toru Yoshihara; Takashi Saito, all of Nagaokakyo, Japan

[73] Assignee: Mitsubishi Denki Kabushiki Kaisha, Tokyo, Japan

[21] Appl. No.: 368,180

[22] Filed: Jun. 19, 1989

[30] Foreign Application Priority Data

Jun. 20, 1988 [JP] Japan ................. 63-151651
Jul. 27, 1988 [JP] Japan ................. 63-185569
Aug. 4, 1988 [JP] Japan ................. 63-195230
Aug. 4, 1988 [JP] Japan ................. 63-195231

[51] Int. Cl.⁵ .......................................... G11B 7/095
[52] U.S. Cl. ......................... 369/44.23; 369/44.32; 369/44.37; 369/54; 369/112
[58] Field of Search ............. 369/44.23, 44.32, 44.33, 369/44.13, 44.25, 44.11, 44.24, 44.41, 44.42, 44.37, 109, 110, 111, 112, 44.14, 54

[56] References Cited

U.S. PATENT DOCUMENTS

| | | | |
|---|---|---|---|
| 4,532,522 | 7/1985 | Tsunada et al. | 369/44.38 |
| 4,589,103 | 5/1986 | Tajima . | |
| 4,634,853 | 1/1987 | Kanamaru | 369/44.32 |
| 4,768,183 | 8/1988 | Ohnishi et al. | 369/44.37 |
| 4,817,072 | 3/1989 | Toide et al. | 369/44.23 |
| 4,835,752 | 5/1989 | Nakatsu et al. | 369/32 |
| 4,841,507 | 6/1989 | Imai et al. | 369/44 |
| 4,924,079 | 5/1990 | Opheij et al. | 369/44.11 |
| 4,954,702 | 9/1990 | Kurogama et al. | 369/44.14 |

FOREIGN PATENT DOCUMENTS

0188624  7/1986  European Pat. Off. .
0201603 11/1986  European Pat. Off. .
0241267 10/1987  European Pat. Off. .
3533647  3/1986  Fed. Rep. of Germany .
2235354  1/1975  France .
2260911  9/1975  France .
2520542  7/1983  France .
1501141  2/1978  United Kingdom .
2083252  3/1982  United Kingdom .
2166583  8/1986  United Kingdom .

OTHER PUBLICATIONS

Patent Abstracts of Japan, vol. 9, No. 323 (P-414)(2046) Dec. 18, 1985, & JP60147940.
Patent Abstracts of Japan, vol. 9, No. 48 (P-338)(1771) Feb. 28, 1985 & JP59186140.
Patent Abstracts of Japan, vol. 9, No. 161 (P-370)(1884) Jul. 5, 1985, & JP6038743.
Patent Abstracts of Japan, vol. 9, No. 217 (P-385)(1940) Sep. 4, 1985, & JP6076038.
Patent Abstracts of Japan, vol. 8, No. 275 (P-321)(1712) Dec. 15, 1984, & JP 59/42758.
Ojima et al, "High-Speed Overwritable Optical Disk", SPIE vol. 899 Optical Storage Technology and Applications, 1988.
Yokogawa Hewlett-Packard's 85 Opto-Device Component Catalog, "High Resolution Optical Reflective Sensor: HBCS-1100", pp. 212–217.
Fotonics Company's "MTI 1000 Fotonic Sensor", Jun. 9, 1983.
Patent Abstracts of Japan, vol. 8, No. 144 (P-284)[1581], Jul. 1984, & JP5942646.
Patent Abstracts of Japan, vol. 8, No. 60 (P-262)[1497], Mar. 1984, & JP58208939.

Primary Examiner—Wayne R. Young
Attorney, Agent, or Firm—Leydig, Voit & Mayer

[57] ABSTRACT

An optical head device includes a tilt servo mechanism using photodetectors for detecting rays of light reflected from the recording surface of an optical disk. The rays of light are obtained from a laser diode used as a light source for information reproduction. According to one aspect; prisms are formed on the flange of a converging lens to refract peripheral portions of the light emitted from the laser diode for tilt detection. According to another aspect, secondary diffraction grating domains at the sides of the primary diffraction domain of a diffraction grating diffract peripheral portions of the emitted rays of light for tilt detection. According to another aspect, a mirror reflects peripheral portions of the emitted rays from the laser diode. According to a further aspect a mirror reflects the light from the laser diode passing through a beam splitter. Each photodetector receiving the light reflected from the recording surface of the disk may be partitioned into two detector cells, and a tilt signal is obtained as the differential output of the two cells.

37 Claims, 26 Drawing Sheets

FIG. I
PRIOR ART

FIG. 13(a)  FIG. 13(b)  FIG. 13(c)
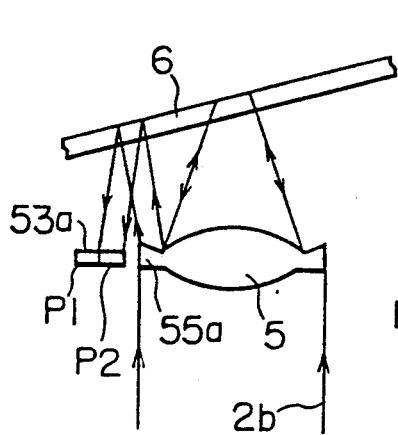
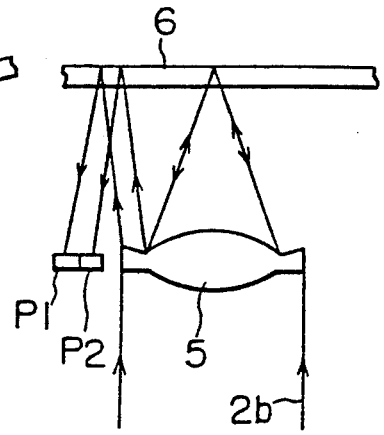
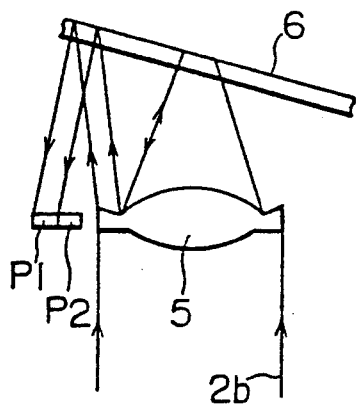
FIG. 14(a)  FIG. 14(b)  FIG. 14(c)
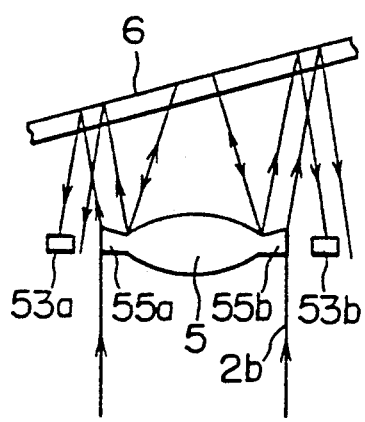
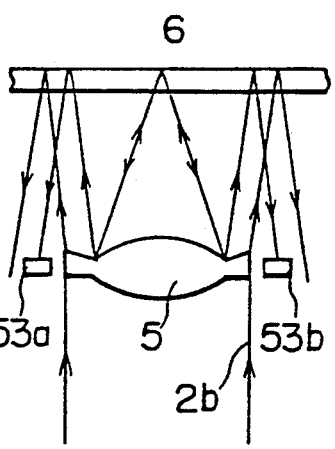
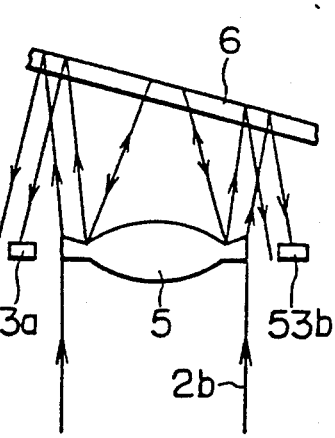
FIG. 15
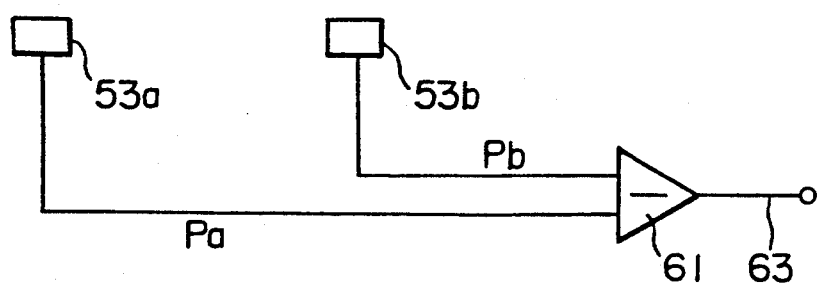

OPTICAL HEAD WITH A TILT CORRECTION SERVO MECHANISM

BACKGROUND OF THE INVENTION

This invention relates to optical recording and reproducing devices for recording information on and reproducing it from an optical disk, and more particularly to optical heads thereof provided with a servo mechanism for correcting the tilting of the optical axis of the light beam with respect to the recording surface of the optical disk.

Optical disk recording and reproducing devices are now widely used for information storage. In such devices, information is stored on spiral tracks formed on an optical disk and is recorded and read by a laser light beam focused on the disk by an optical head. In order to ensure that the light beam is converged correctly on the track, the optical heads must be provided with servo mechanisms for correcting focusing and tracking errors thereof. Further, they must be provided with a tilt servo mechanism; namely, if the optical axis of the light beam radiated from the optical head is not at right angles to the information recording surface of the optical disk, an aberration called a coma may result, and cause crosstalk between the adjacent tracks. In order to prevent comas, the optical heads must be provided with a servo mechanism for correcting the tilting of the light beam away from the direction at right angles to the recording surface of the optical disk.

FIGS. 1 through 7, show the structure of an optical head provided with a conventional servo mechanism for correcting the tilting of the light beam as well as for correcting focusing and tracking errors.

FIG. 1 shows the overall organization of an optical head device of an optical disk recording and reproducing device. The optical head device utilizes the twin spot method and the astigmatic method (described below) for detecting tracking and the focusing errors, respectively. A laser diode 1 constitutes a light source for emitting a divergent pencil of rays 2. The emitted pencil of rays 2 is separated by a diffraction grating 3 into three pencils of rays 2a, which are reflected by a beam splitter 4, collimated into parallel pencils of rays 2b by a collimating lens 7, and converged by a converging lens 5 at spots 9a, 9e and 9f, respectively, along a track 8 on an optical disk 6. The disk 6 is rotated by a motor 60 and comprises a transparent substrate 6a and a recording surface 6b on which information recording tracks 8, 8a and 8b are formed. The rays of light reflected at the spots 9a, 9e, and 9f along the track 8 are directed via the converging lens 5 and collimating lens 7 to the beam splitter 4 for reparation from the emitting pencils of rays 2b and fall upon a photodetector 10 as three reflected pencils of rays 2c. The beam splitter 4 comprises, in addition to a partially silvered surface for separating the reflected rays 2c from the emitted pencil of rays 2a, a grating having a grating interval that varies gradually within the opening thereof to give an astigmatic abberation (astigmatism) to the reflected rays 2c that are diffracted light of first order.

FIG. 2 shows a vertical section of the converging lens 5. The converging lens 5 comprises a lens portion 5a for converging the emitted and reflected pencils of rays 2b and 2c, a flange 5b for supporting the converging lens portion 5a, and an attachment 5c for connecting the lens portion 5a to actuators 5d and 5e (described below) via the flange 5b. These portions 5a through 5c of the converging lens 5 are formed as a single integral piece.

FIG. 3 shows a slightly modified optical head device wherein the collimator lens 7 of the device of FIG. 1 is not utilized; otherwise, the optical disk device of FIG. 1 is similar to that of FIG. 1 both in its structure and method of operation, wherein like reference numerals represent like or corresponding parts.

As shown in FIG. 4, the photodetector 10 comprises a central portion partitioned into four cells A through D, and a pair of lateral cells E and F. The central pencil in the emitted rays 2b which falls on and is reflected at the information reading spot 9a on the track 8 posses through the converging lens 5, the collimating lens 7, and the beam splitter 4, and then falls on the central portion consisting of cells A through D as the central information carrying pencil of rays 20a (shown by a cross-hatched circle in the figure). The lateral pencils in the emitted rays 2b falling on and reflected at the spots 9e and 9f pass through the converging lens 5, the collimating lens 7, and the beam splitter 4, and then fall on the lateral cells E and F as the pencils of rays 20e and 20f for determining the tracking error. The tracking and focusing errors are adjusted by the tracking actuator 5e and the focusing actuator 5d, respectively, in response to the signals generated by the circuit shown in FIG. 4, on the principles of the twin spot method and the astigmatic aberration method, respectively, as described below.

The tracking error may be caused by the fact that the center of the optical disk 6 deviates from the center of rotation of the motor 60 due to mounting error, etc. Such tracking error is detected and adjusted by the twin spot method as follows.

The pencil of rays 2 emitted from the laser diode 1 is separated by the diffraction grating 3 into three pencils of rays (i.e. a central pencil and a pair of lateral pencils of rays) which are converged on spots 9a, 9e and 9f along an information recording track 8 as described above. Since the information is carried by the central pencil of rays 20a reflected from the central light spot 9a, the spot 9a should be positioned precisely on track 8. Thus, the line connecting the converging light spots 9a, 9e and 9f is slightly inclined with respect to the direction of the track 8. The pencils of rays reflected diffusively at spots 9e and 9f are converged via the converging lens 5, the collimating lens 7 (which is omitted in the case of the device of FIG. 3), and the beam splitter 4 on the cells E and F of the photodetector 10 as lateral pencils of rays 20e and 20f. The subtractor 13 calculates the difference between the outputs of the two lateral photodetector cells E and F, and the phase compensation circuit 14 outputs in response to the differential output of the subtractor 13 a tracking error signal $V_{AT}$ corresponding to the tracking error, i.e. the deviation of the information reading spot 9a from the track 8 in the X direction perpendicular to the Y direction of the track 8. In response to the tracking error signal $V_{AT}$, the tracking actuator 5e adjusts the position of the converging lens 5 in the X direction perpendicular to the track Y direction (as indicated by arrows AT in FIG. 3), so as to position the information reading spot 9a correctly on the center of the track 8.

On the other hand, focusing error may be caused by the fact that the surface of the optical disk 6 is uneven, which may result in an undulating motion of the surface when the disk is rotated. Focusing error is detected and adjusted by the astigmatic method as follows.

As described above, the beam splitter 4 gives an astigmatism to the central pencil of rays 20a reflected from the information reading spot 9a. The photodetector 10 is positioned in the Z direction perpendicular to the surface of the optical disk 6 at a location at which the central pencil of rays 20a falls on the central portion (i.e. the cells A through D) of the photodetector 10 as a substantially circular radiation spot of minimum blur, as shown by cross-batching in FIG. 4, when the light spot 9a is focused precisely on the track 8. As the spot 9a on the optical disk 6 becomes too near to or too far away from the optical head (i.e., the converging lens 5) to cause a focusing error, the pencil of rays 20a on the central photodetector cells A through D is deformed into an oblong elliptic form, elongated either in the diagonal direction across cells A and C or in the other diagonal direction perpendicular thereto across cells B and D, as shown by dotted curves in FIG. 4. A subtractor 12 having an input terminal coupled to the outputs of cells A and C and another input terminal coupled to the outputs of cells B and D calculates the difference $(A+C)-(B+D)$ between the sum $(A+C)$ of the outputs of cells A and C and the sum $(B+D)$ of the outputs of cells B and D. In response to the output of the subtractor 12, the phase compensation circuit 15 outputs a focusing error signal $V_{AF}$ corresponding to the focusing error of the spot 9a in the Z direction of the optical axis O perpendicular to the surface 6b of the optical disk 6. In response to the focusing error signal $V_{AF}$, the focusing actuator 5d adjusts the position of converging lens 5 in the Z direction of the optical axis O so as to correct the focusing error. As is well known, it is preferred that the direction of astigmatism generated by the plate-shaped beam splitter 4 form an angle of 45 degrees with the Y direction of the tracks 8, 8a, and 8b. Thus, the laser diode 1 is positioned such that the pencil of rays 2 emitted therefrom forms an angle of 45 degrees with the Y direction of the tracks on the optical disk 6.

The sum $(A+B+C+D)$ of the outputs of the four central photodetector cells A through D, which is calculated by an adder 11, is utilized as the information reproducing signal $V_{RF}$ in an information reproducing circuit (not shown) of the optical disk recording and reproducing device.

As described above, the focusing and the tracking error are detected by the astigmatic method and the twin spot method, respectively, whereby a single light source, i.e. the laser diode 1, is utilized both in reading out information from the optical disk 6 and in detecting the focusing and tracking errors. Thus, the structure of the device for the detection of such errors is relatively simple. However, as described below in reference to FIGS. 5 and 6, the conventional optical head device is in need of a separate light source for detecting the tilting of the optical head with respect to the optical disk.

The tilting of the optical axis O (see FIGS. 1 and 3) of the optical head, i.e. the converging lens 5, from the Z direction perpendicular to the recording surface 6b of the optical disk 6 may be caused either by the bending of the transparent substrate 6a of the optical disk 6 or by the slanting of the rotational axis of the optical disk 6 from the Z direction. When this tilting of the optical axis of the optical head with respect to the recording surface 6b of the optical disk 6 occurs, an aberration called a coma results, which may cause crosstalk from the tracks 8a and 8b adjacent to the current information reading or recording track 8 on which the information is to be recorded and reproduced by the optical head. Such crosstalk present an especially serious problem in the case of devices such as optical video disks where the information is recorded as an analog signal.

FIG. 5 shows the structure of a conventional tilt servo mechanism for correcting the tilting of the optical head with respect to the surface of the optical disk 6. A light emitting diode 30 and a pair of photodetectors 31 and 32 are mounted on the head supporting box 33 which accommodates the above described optical head device therein. The box 33 is rotatably supported by a support member 33a via a rotational shaft 33b. The light emitted from the light emitting diode 30 is reflected by the recording surface 6b of the disk 6 and falls on the photodetectors 31 and 32. A subtractor 34 calculates the difference between the outputs of the two photodetectors 31 and 32. In response to the differential output of the subtractor 34, a phase compensation circuit 35 outputs to a motor 36 a signal corresponding to the amount of the tilting of the optical head with respect to the recording surface 6b of the disk 6. Thus, in response to the tilt signal from the circuit 35, the motor 36 drives the head supporting box 33 around the shaft 33b via a screw 37 to adjust the angle of the box 33 with respect to the surface of the disk 6.

The output of the two photodetectors 31 and 32 are equal when the optical axis of the optical head accommodated in the box 33 is perpendicular to the recording surface 6b of the disk 6. When the recording surface 6b of the disk 6 is tilted around an axis running in the direction of the tracks on the surface 6b, the amount of light incident on the two photodetectors 31 and 32 becomes uneven, as shown in FIG. 6. Thus, the output of the subtractor 38 becomes positive or negative according to whether the recording surface 6b of the disk is tilted in one direction or the other. Consequently, the output of the phase compensation circuit 35 corresponds to the amount of the tilting, and the box 33 is adjusted via the motor 36 in such a manner that the optical axis of the optical head accommodated in the box 33 is maintained at right angles with the recording surface 6b of the disk 6.

In the case of the devices shown in FIGS. 1 and 3, the photodetector 10 is positioned at a point on the optical axis O of the converging lens 5. Thus, as shown schematically in FIG. 7(b), the light emitted from the laser diode 1 and reflected by the beam splitter 4 is converged on the recording surface 6b on the disk 6, while the light reflected from the recording surface 6b of the disk 6 is converged on the photodetector 10 after passing through the beam splitter 4. However, the positions of the laser diode 1 and the photodetector 10 with respect to the beam splitter 4 may be reversed, as shown in FIG. 7(a), so that the light emitted from the laser diode 1 which lies on the optical axis O of the converging lens 5 passes through the beam splitter 4 and converged on the recording surface 6b on the disk 6. In this case, the light reflected from the recording surface 6b of the disk 6 and converged by the converging lens 5 is reflected by the beam splitter 4 before falling on the photodetector 10.

As described above, conventional optical head devices are provided with a separate light source for the tilt servo mechanism, and hence have the problem that the need for the provision of a separate light source for the tilt detection results in additional optical parts and an additional cost furthermore, since the space between the upper surface of the head supporting box 33 and the optical disk 6 is small, the disposition of the light emitting diode 30 and the photodetectors 31 and 32 thereon imposes a limitation on the design of the optical head device.

SUMMARY OF THE INVENTION

It is a primary object of this invention to provide an optical head device provided with a tilt servo mechanism whereby a separate light source for tilt detection is unnecessary, so that the device can be small in size and inexpensive and the limitations imposed on the design of the device by the need for a separate light source can be removed.

It, is an additional object of this invention to provide an optical head device provided with means for utilizing, for the purpose of tilt detection, an hitherto unused portion of rays of light emitted from the light source which is provided for reproducing information.

An optical head device according to this invention comprises a light source, a converging lens, a beam splitter, and a photodetector for information reproduction, as in the case of conventional devices. It may further comprise a diffraction grating and other parts for focusing and tracking detection. These elements have already been described above.

According to a first aspect of this invention, the above objects are accomplished in an optical head device which further comprises a refracting means (e.g. a prism or prisms) disposed on a peripheral flange of the converging lens for converging the rays emitted from the light source on the recording surface of the optical disk. The refracting means refracts a peripheral portion of the light emitted from the light source and thus deflects and directs it to a spot on the recording surface of the disk that is situated to a side of the spot on which the central portion of the rays of light emitted from the light source is converged by the converging lens. The peripheral rays thus reflected from the side spot on the recording surface of the disk are received and detected by a second photodetector which is disposed, for example, at a side of the main photodetector for information reproduction for receiving and detecting the central rays that are reflected from the recording surface of the disk. The tilting of the disk with respect to the optical axis of the converging lens of the optical head device is determined on the basis of the output of the second photodetector.

According to a second aspect of this invention, the above objects are accomplished in an optical head device which comprises, in addition to a primary diffraction grating for resolving the central portion of the rays emitted from the light source into a plurality of pencils of rays, at least one secondary diffraction grating formed integrally with the primary diffraction grating at a side thereof. A peripheral portion of the light emitted from the light source and falling on the secondary diffraction grating is diffracted and thereby deflected via the beam splitter and the converging lens to a spot on the recording surface of the disk which is situated to a side of the spot on which the central rays passing through the primary diffraction grating are converged. The peripheral rays diffracted by the secondary diffraction grating, converged by the converging lens, and reflected at the side spot on the recording surface of the disk are detected by a second photodetector. The tilting of the disk with respect to the optical head device is determined on the basis of this second photodetector.

According to a third and a fourth aspect of this invention, reflection means (i.e. a mirror or mirrors) is used to obtain rays of light for tilt detection. According to the third aspect of this invention, the reflection means is used for reflecting a peripheral portion of the rays emitted from the light source, to direct it to a side spot on the recording surface of the disk via the beam splitter and the converging lens. On the other hand, according to the fourth aspect of this invention, the reflection means is used for reflecting the portion of the rays emitted from the light source which is not directed to the converging lens via the beam splitter, i.e. the hitherto unused portion of rays among the two portions of rays into which the emitted light is split by the beam splitter. This portion of the rays is thus directed to a side spot on the recording surface at a side of the information reading spot. In either the third or fourth aspect of this invention, the light reflected from the side spot on the recording surface of the disk is detected by a second photodetector, and the tilting of the disk with respect to the optical head is determined on the basis of the output of the second photodetector.

It is preferred that the second photodetector comprise at least two photodetector cells, and that the tilting of the disk be detected from the differential output of the two cells. The attitude of the optical head device is adjusted by an actuator such as a motor in response to the detected tilting of the disk with respect to the optical head, so that the optical axis of the converging lens of the optical head is maintained at right angles to the recording surface of the disk.

According to the first through third aspects of this invention, hitherto unused peripheral portions of the rays emitted from the light source are used for tilt detection. According to the fourth aspect, the hitherto unused portion of the rays in the two portions into which emitted rays are split by the beam splitter is used for tilt detection. Thus, according to any one of the four aspects of this invention, the tilt detection can be effected without utilizing a separate light source.

BRIEF DESCRIPTION OF THE DRAWINGS

The novel features which are believed to be characteristic of this invention are set forth with particularity in the appended claims. This invention itself, however, in its several aspects may best be understood from the following detailed description of the preferred embodiments taken in conjunction with the accompanying drawings, in which:

FIGS. 13(a) through 13(c) are views similar to those of FIGS. 12(a) through 13(c), but showing an optical head device having a prism and a photodetector only at one side of the converging lens;

FIGS. 14(a) through 14(c) are also views similar to those of FIGS. 12(a) through 12(c), but showing an optical head device which comprises prisms and photodetectors at both sides with each photodetector consisting of a single photodetector cell;

FIG. 15 is a circuit diagram showing a circuit for outputting a tilt detection signal in the optical head device of FIG. 14;

FIGS. 19(a) and 19(b) show the diffraction grating of the optical head device of FIG. 18 in greater detail, wherein FIG. 19(a) is a side view thereof, while FIG. 19(b) is a front view thereof as viewed from the X direction, showing the grating patterns of the central and peripheral domains;

FIG. 25 shows another optical head device provided with a pair of reflecting mirrors, wherein the photodetectors for tilt detection are disposed on the flange of the converging lens, wherein

In the drawings, like reference numerals represent like or corresponding parts, unless stated explicitly otherwise.

DETAILED DESCRIPTION OF THE PREFERRED EMBODIMENTS

Referring now to the accompanying drawings, the preferred embodiments of this invention are described.

A) Converging Lens with Peripheral Prism Portions

Figure 8:
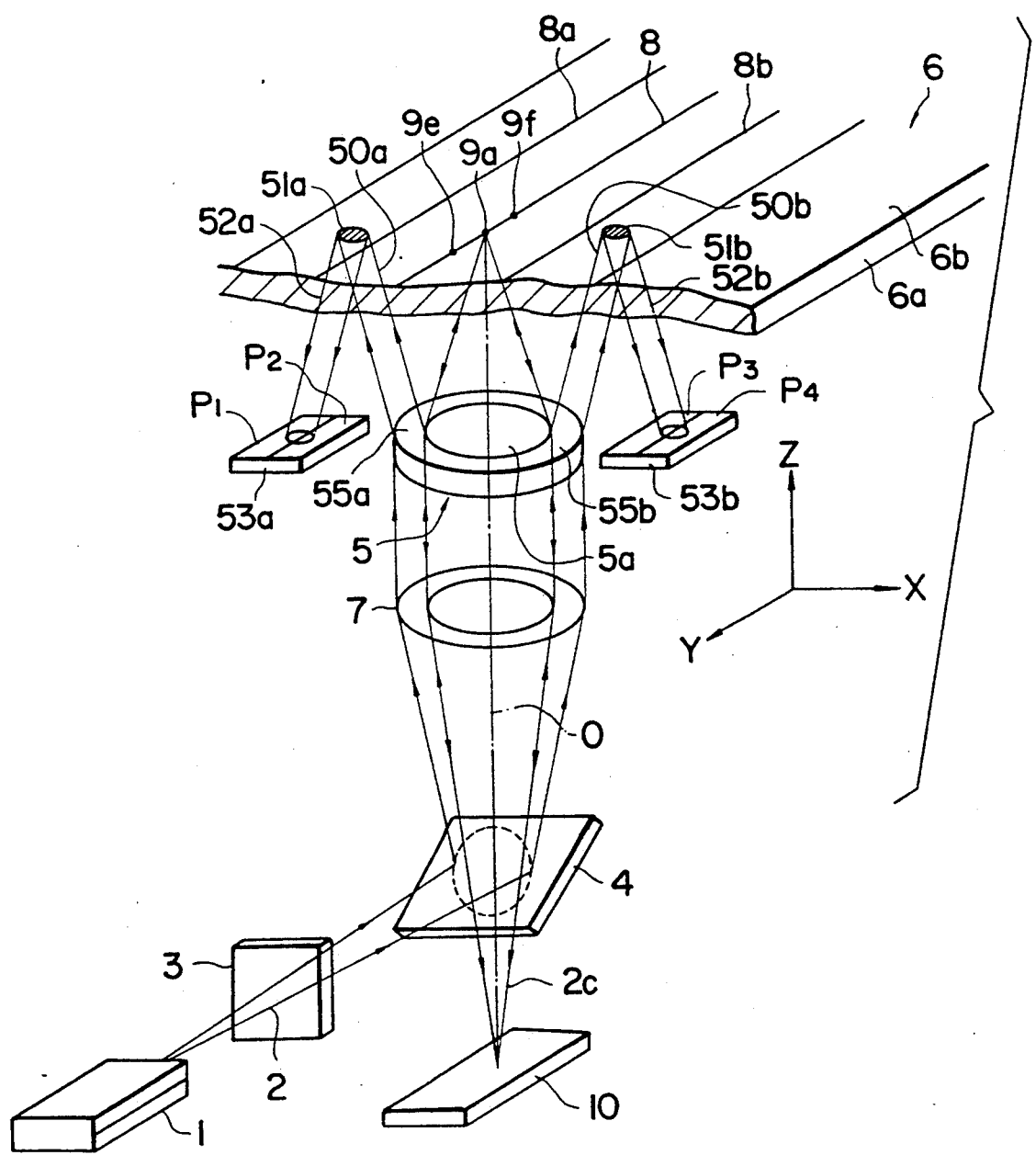
FIG. 8 is a perspective view of an optical head device provided with prisms formed at two sides of the flange of the converging lens according to a first aspect of this invention.

FIG. 8 shows the overall structure of an optical head device having a converging lens 5 which comprises peripheral prism portions for refracting a peripheral portion of the light emitted from the laser diode 1 and thereby separating and deflecting it for the purpose of tilt detection. The device of FIG. 8 is similar to that shown in FIG. 1 except for the peripheral prismatic structure of the converging lens 5, and the tilt detection system associated therewith, and like reference numerals represent like or corresponding parts or portions. Therefore, only those portions which are different from the corresponding portions of the device of FIG. 1 will be described.

Figure 4:
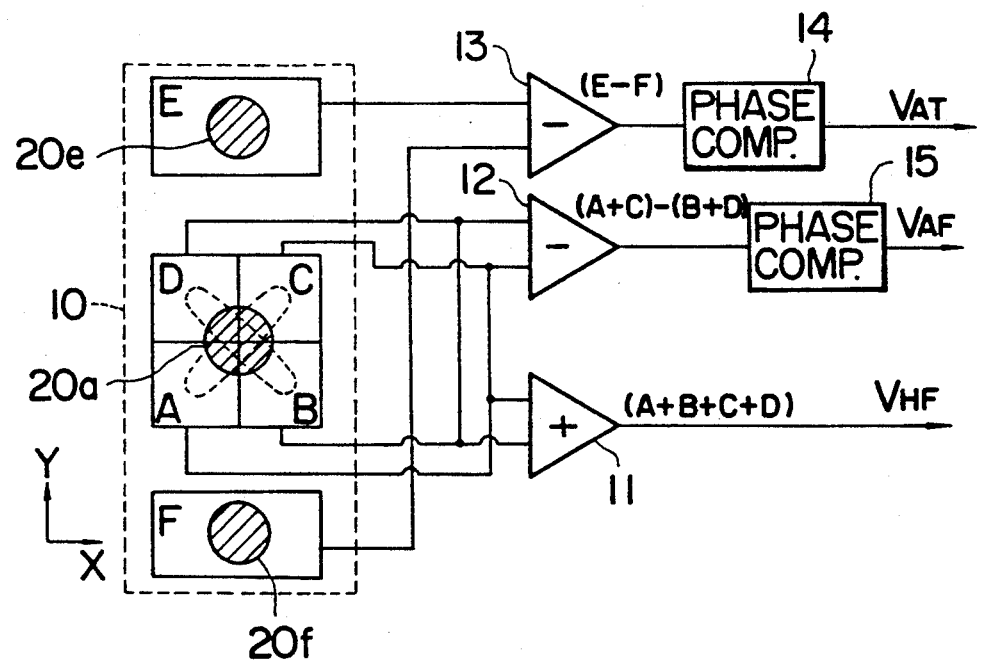
FIG. 4 is a circuit diagram showing, together with a schematic plan view of the photodetector, a circuit for outputting a tracking and the focusing error signal together with an information reproduction signal.
Figure 9:
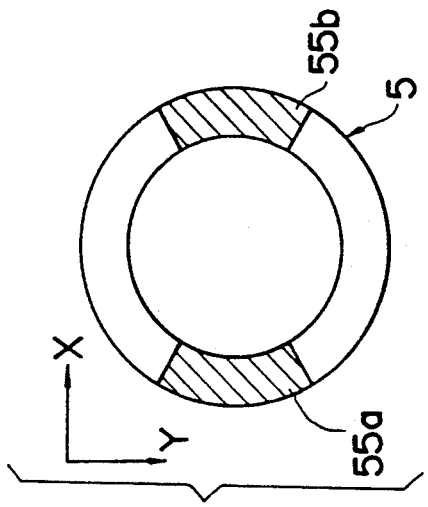
FIG. 9 shows a vertical section along the X direction of the converging lens of the optical head device of FIG. 8 which is provided with the prisms.
Figure 10:
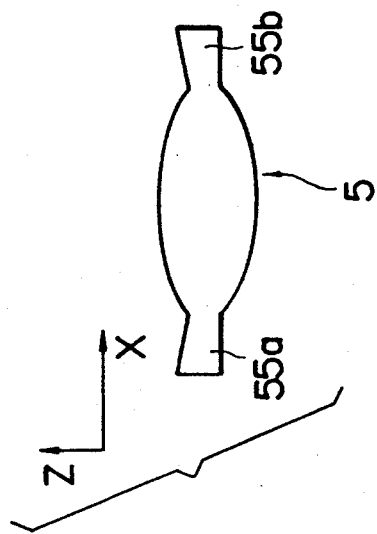
FIG. 10 is a plan view of the converging lens of FIG. 8.

The central portion of the light emitted from a laser diode 1 is diffracted and resolved into three pencils of rays by a diffraction grating 3, reflected by a beam splitter 4, and collimated by a collimating lens 7, after which it reaches the converging lens 5. As shown in FIGS. 9 and 10, the converging lens 5 comprises, in addition to the central converging lens portion 5a, prism portions 55a and 55b (cross-hatched in FIG. 10) which are situated on both sides thereof in the X direction X perpendicular to the direction of the tracks 8, 8a, and 8b on the recording surface 6b of the optical disk 6. The peripheral rays of light incident on these prism portions 55a and 55b are refracted in the two directions away from the optical axis O of the converging lens 5 along the X direction to form a pair of tilted peripheral pencils of rays 50a and 50b. The prism portions 55a and 55b of the converging lens 5 may be formed by shaping the flange 5b of the converging lens 5 of FIG. 2 into prismatic form. The three pencils of rays incident on the converging lens portion 5a are converged on three spots 9a, 9e, and 9f along a track 8 and reflected therefrom to a photodetector 10 via the converging lens 5, collimating lens 7 and the beam splitter 4. On the basis of the outputs of the photodetector 10, which has a structure as shown in FIG. 4, focusing and tracking error signals are obtained as well as an information reproducing signal, as described above in reference to FIGS. 1 and 4.

The tilted pencils of rays 50a and 50b refracted by the prism portions 55a and 55b of the converging lens 5 fall on spots 51a and 51b situated on the recording surface 6b of the disk 6 to either side of the information reading spot 9a. The pencils of rays 50a and 50b are reflected at these spots 51a and 51b and fall on a pair of photodetectors 53a and 53b as reflected pencils of rays 52a and 52b. The photodetectors 53a and 53b positioned on either side of the converging lens 5 along the X direction, are each partitioned into two cells, photodetector 53a into cells P1 and P2 photodetector 53b into cells P3 and P4.

Figure 11:
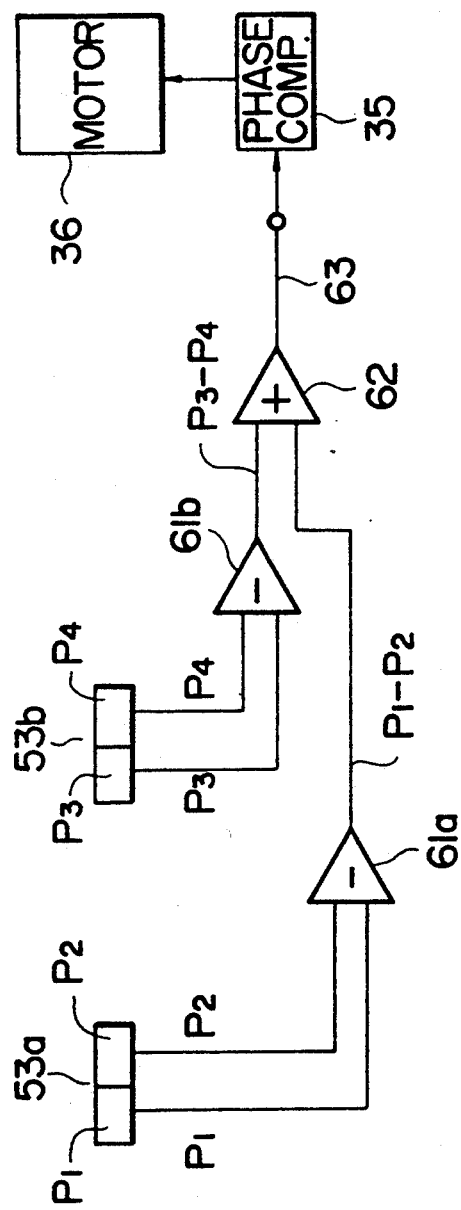
FIG. 11 is a circuit diagram of the tilt detection circuit of the optical head device of FIG. 8.

As shown in FIG. 11, the outputs of cells P1 and P2 of photodetector 53a are coupled to a subtractor 61a which outputs the difference P1−P2 between the two outputs of cells P1 and P2. The outputs of cells P3 and P4 of photodetector 53b are coupled to a subtractor 61b which outputs the difference P3−P4 between the two outputs P3 and P4. Thus, the adder 62 coupled to the outputs of the subtractors 61a and 61b outputs a tilt detection signal 63 equal to the sum of the two differences (P1−P2)+(P3−P4). A motor 36 similar to the one described above in reference to FIG. 5 is supplied with the tilt detection signal 63 via a phase compensation circuit 35 and adjusts the attitude of the head supporting box, as described above.

Figure 5:
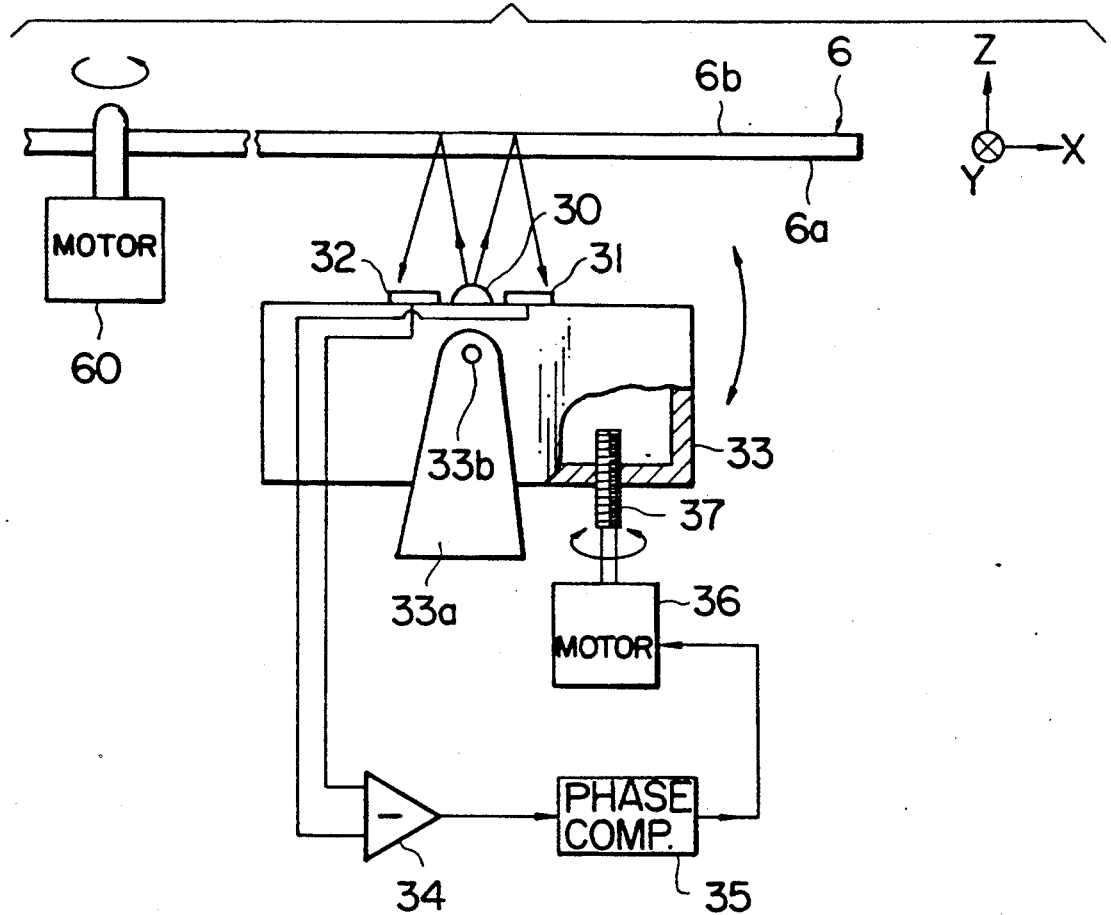
FIG. 5 is a schematic side view of an optical head device provided with a conventional tilt servo mechanism.
Figure 6:
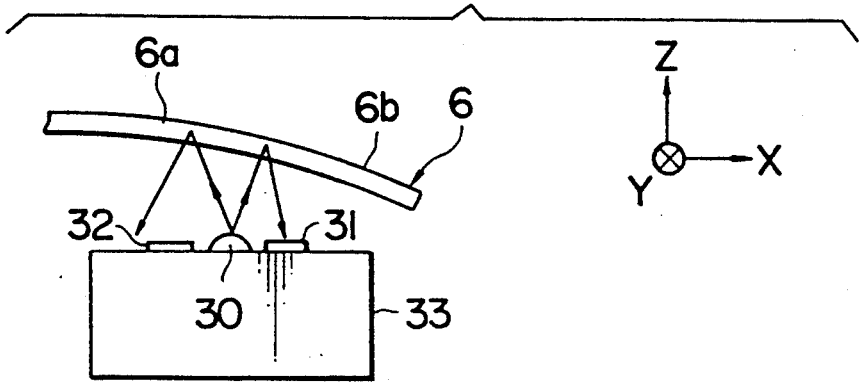
FIG. 6 is a partial side view of the device of FIG. 5, for illustrating the principle of tilt detection.
Figure 12A:
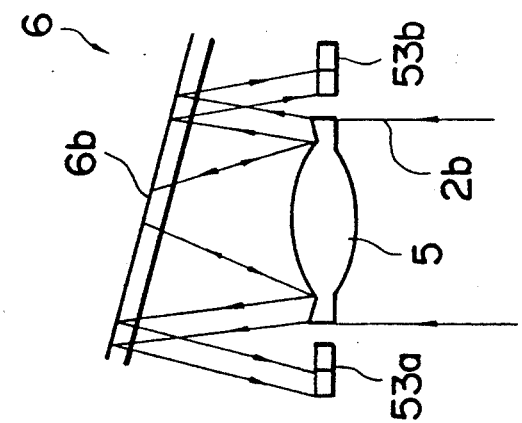
FIGS. 12(a) through 12(c) are partial side views of the device of FIG. 8, showing the principle of tilt detection effected by means of the partitioned photodetector cells.
Figure 12B:
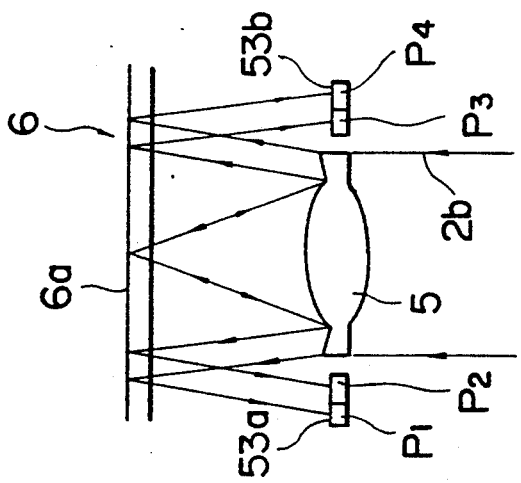
Figure 12C:
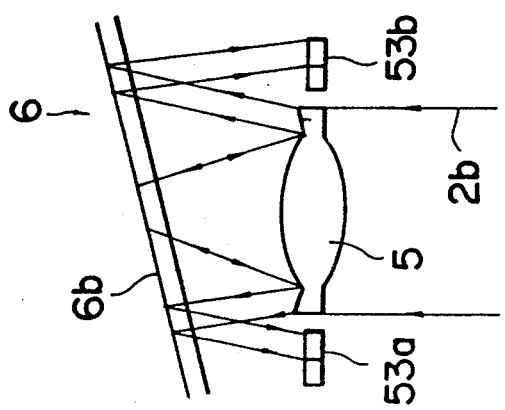

FIGS. 12(a), 12(b), and 12(c) show the principle of tilt detection. As shown in FIG. 12(b), the photodetectors 53a and 53b are disposed in such a manner that amounts of light incident on the photodetector cells P1 and P3 are equal to the amounts of light incident on cells P2 and P4, respectively, when the optical axis of the converging lens 5 is at right angles to the recording surface 6b of the disk 6. Thus, the tilt detection signal 63 output by the adder 62 is equal to zero when there is no tilting of the disk 6 with respect to the optical axis of the converging lens 5. When the recording surface 6b of the disk 6 is tilted such that the outer portion of the disk 6 is raised as shown in FIG. 12(a), the amounts of light incident on cells P2 and P4 become greater than the amounts of light incident on cells P1 and P3, so the tilt detection signal 63 becomes negative. On the other hand, when the recording surface of the disk 6 is tilted such that the inner portion of the disk 6 is raised as shown in FIG. 12(c), the amounts of light incident on cells P1 and P3 become greater than the amounts of light incident on cells P2 and P4; thus, the tilt detection signal 63 becomes positive. In response to the tilt detection signal 63, the motor 36 for adjusting the angle of the optical head supporting box 33 shown in FIG. 5 is driven to maintain the optical axis O of the converging lens 5 at right angles to the recording surface 6b of the disk 6.

In the above embodiment, a pair of photodetectors 53a and 53b, each partitioned into two cells, are disposed on either side of the converging lens 5. However, as shown in FIGS. 13(a), 13(b), and 13(c), only one photodetector, e.g., photodetector 53a on one side of the converging lens 5 may be utilized. In this case, the converging lens 5 comprises a prism portion 55a only at the side at which the photodetector 53a is disposed. The tilt detection signal corresponding to signal 63 of FIG. 11 is obtained by a subtractor coupled to the outputs of photodetector cells P1 and P2 into which the photodetector 53a is partitioned, wherein the subtractor outputs the difference (P1−P2) between the outputs of the two cells P1 and P2. In the case where there is no tilting as shown in FIG. 13(b), the tilt detection signal (P1−P2) is equal to zero. When the outer side of the disk 6 is raised as shown in FIG. 13(a), it is negative. Where the inner side of the disk 6 is raised as shown in FIG. 13(c), it is positive. Thus, the principle of tilt detection is the same as in the case of the device of FIG. 8.

Further, as shown in FIGS. 14(a) through 14(c) the photodetectors 53a and 53b may each consist of a single photodetector cell. The outputs Pa and Pb of the photodetectors 53a and 53b are coupled to a subtractor 61, which outputs the difference (Pa−Pb) between the two outputs as the tilt detection signal 63, as shown in FIG. 15. The tilt detection signal 63 is equal to zero when there is no tilting as shown in FIG. 14(b). It becomes positive or negative as the disk 6 is tilted with respect to the optical axis of the converging lens 5, as shown in FIG. 14(a) and FIG. 14(c), respectively.

Figure 16:
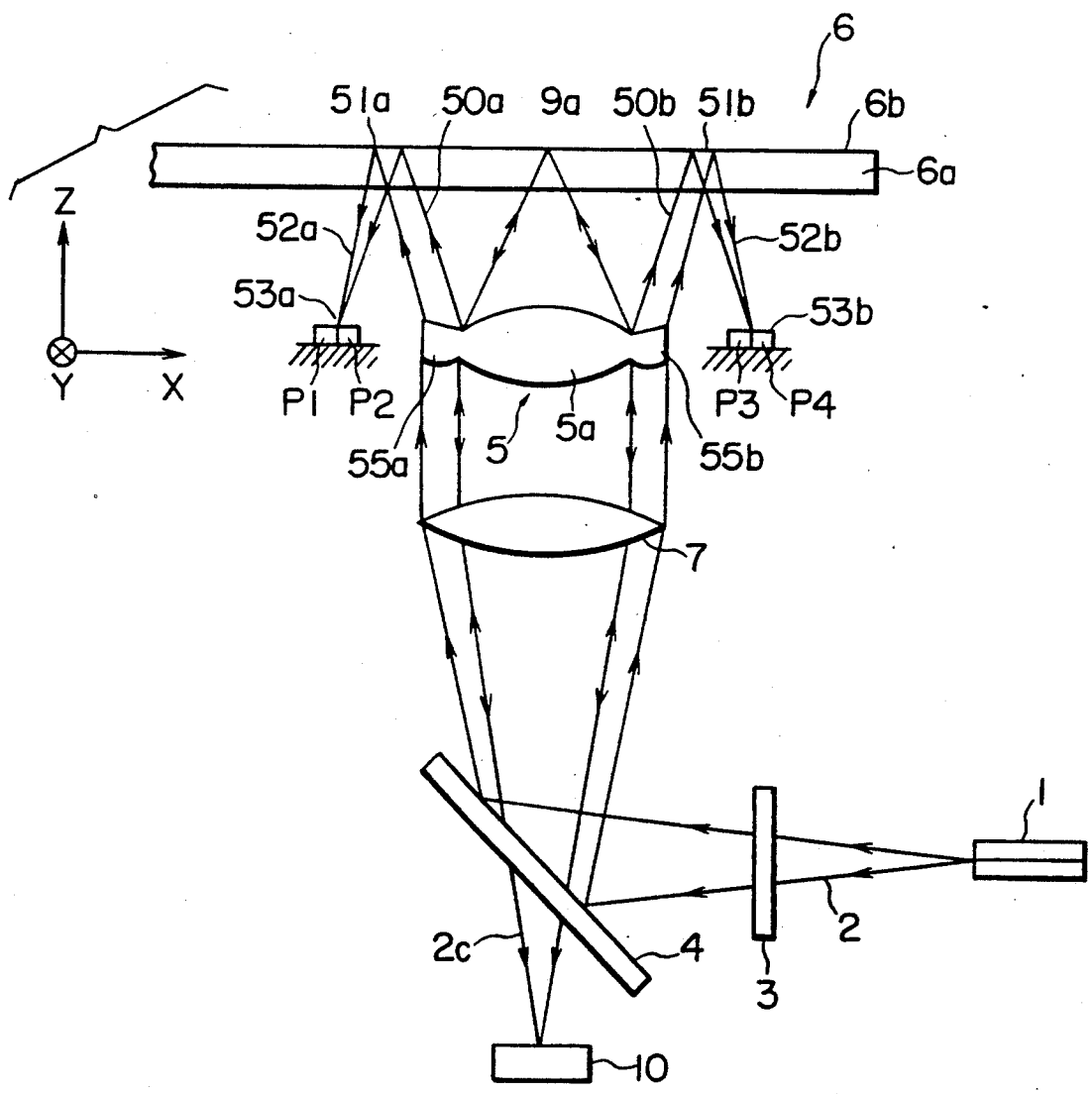
FIG. 16 is a schematic sectional side view of an optical head device provided with prism portions which comprise a convex surface having a light converging function.

FIG. 16 shows still another modification wherein the peripheral side refracting portions 55a and 55b each have a convex surface. Thus, they function not only as prisms for refracting the light incident thereon in the direction away from the optical axis of the converging lens 5, but also as converging lenses, for converging the refracted pencils of rays 50a and 50b. Thus, after pencils of rays 50a and 50b are reflected at spots 51a and 51b, respectively, they are converged on the photodetectors 53a and 53b as reflected pencils of rays 52a and 52b. Since the rays 52a and 52b incident on the photodetectors 53a and 53b, respectively, are converged, the sensitivity of tilt detection can be enhanced.

Figure 17:
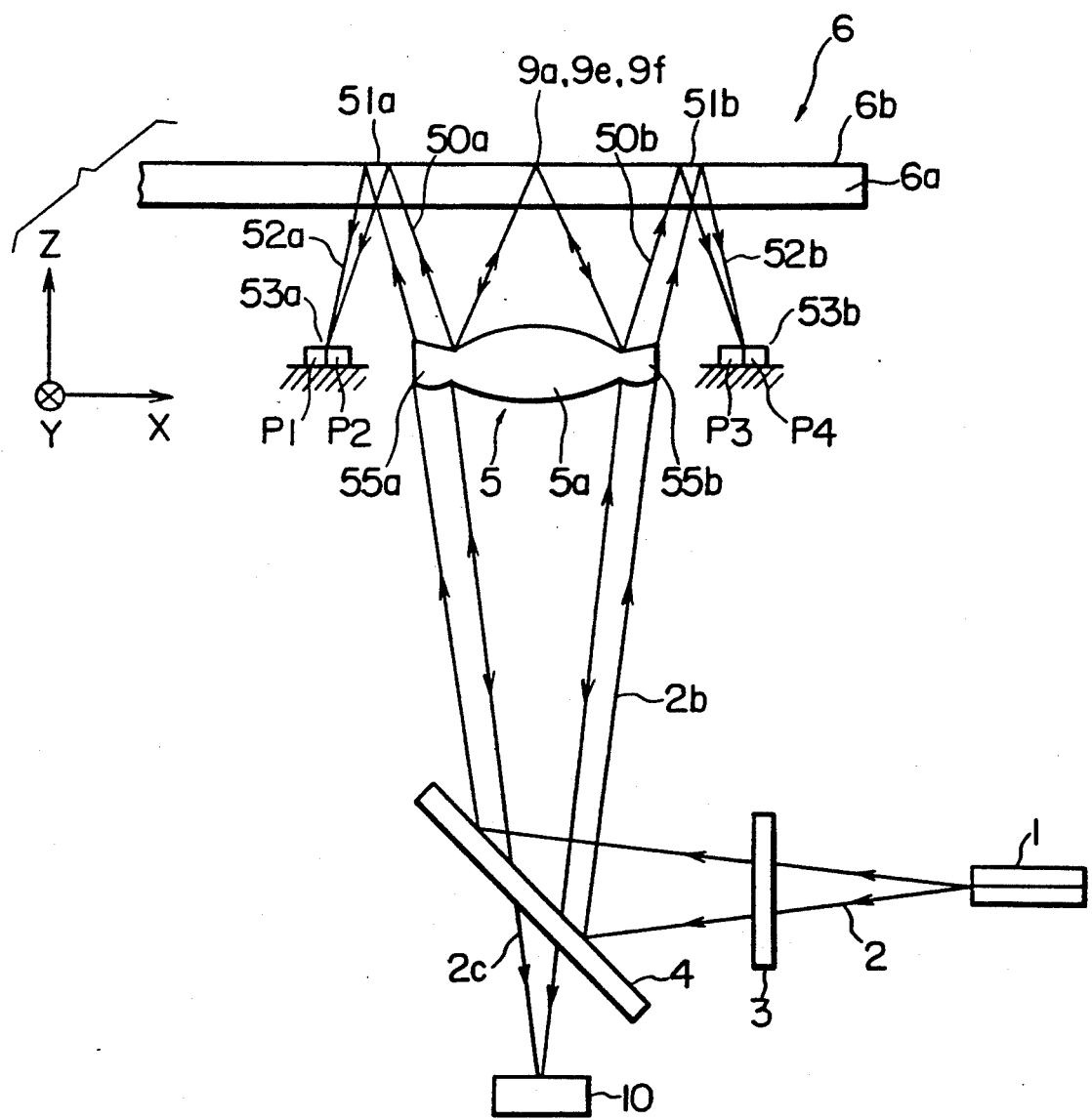
FIG. 17 is a side view of another optical head device provided with prism portions comprising a convex surface, wherein a collimating lens is not utilized.

FIG. 17 shows another embodiment wherein the collimating lens 7 is not utilized. In this case, as in the case of the device of FIG. 3 mentioned above, the lens 5 is a converging lens of a finite converging system which is capable of converging the diverging pencil of rays 2b. Since the peripheral rays of light incident on the side portions 55a and 55b of the converging lens 5 are also diverging in this case, it is preferred that these refracting portions 55a and 55b each have a convex surface so that they function both as refracting prisms and converging lenses, as in the case of the embodiment of FIG. 16.

B) Diffraction Grating with Peripheral Diffraction Domains

Figure 18:
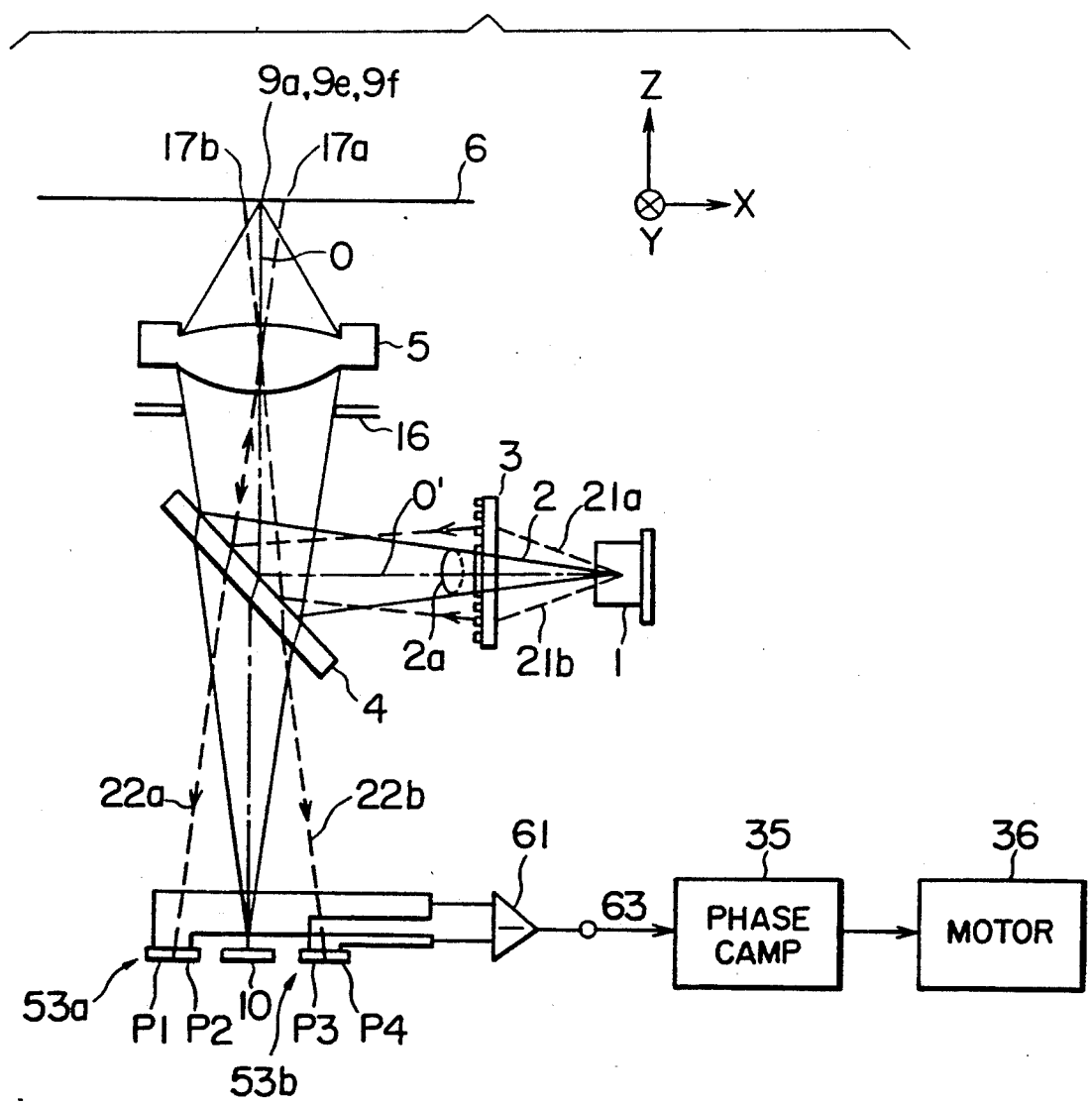
FIG. 18 is a schematic side view of an optical head device according to a second aspect of this invention, wherein the diffraction grating is provided with peripheral diffraction domains for diffracting the peripheral portions of the light emitted from the laser diode.

FIG. 18 shows an embodiment wherein the diffraction grating 3 comprises, in addition to the central or primary diffraction domain, peripheral or secondary diffraction domains for diffracting the hitherto unused peripheral rays of light emitted from the laser diode 1 for the purpose of tilt detection. The device of FIG. 18 is similar to that shown in FIG. 3, and like reference numerals represent like or corresponding parts. The description here is limited for the most part to those portions which are different from the optical head device of FIG. 3.

The light emitted from the laser diode 1 forms a divergent pencil of rays having a Gaussian (i.e. normal) distribution of intensity with a half level angle of about 20 to 40 degrees. Of this light emitted from the laser diode 1, the central portion of the rays 2 (referred to hereinafter as the central or effective pencil of rays) shown by solid lines in the figure is utilized for the reproduction and recording of information and for obtaining the focusing and tracking error signals. The divergence angle of the effective pencil of rays 2, which is determined by an aperture limiter 16, is typically from about 10 to 15 degrees. The portions of the rays 21a and 21b (referred to hereinafter as peripheral pencils of rays) shown by dashed lines in the figure have not hitherto been utilized in optical head devices. According to this embodiment of this invention, these hitherto unused peripheral pencils of rays 21a and 21b are utilized for the purpose of tilt detection.

Figure 19A:
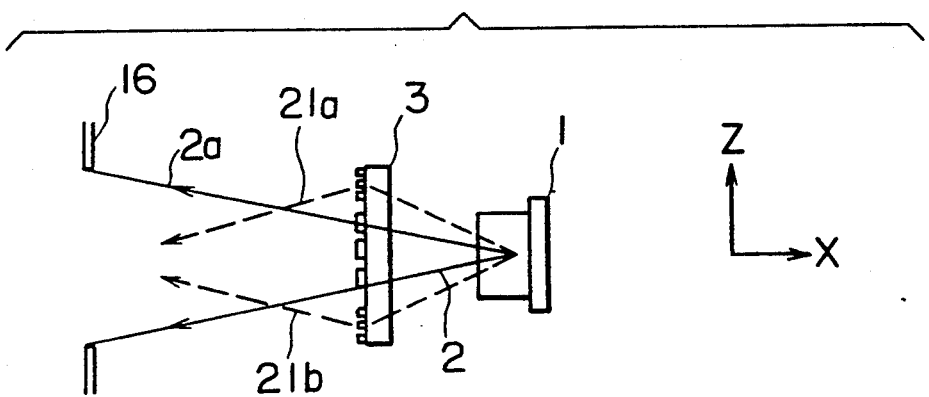
Figure 19B:
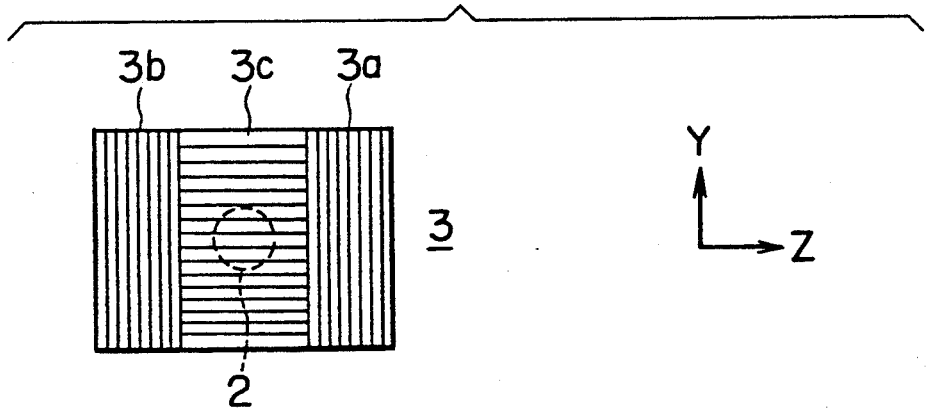

As shown in detail in FIGS. 19(a) and 19(b), the diffraction grating 3 comprises a pair of peripheral or secondary diffraction domains 3a and 3b in addition to the central or primary diffraction domain 3c. The peripheral domains 3a and 3b, which are disposed on both sides of the central domain 3c in the direction, have a pattern of grating with a direction perpendicular to that of the grating in the central domain 3c, as shown clearly in FIG. 19(b).

The effective pencil of rays 2 emitted from the laser diode 1 and falling on the central diffraction domain 3c is resolved into three pencils of rays 2a, of which two side pencils of rays (i.e. diffracted rays of first order) are diverging in the direction of the tracks on the optical disk 6. Thus, these central rays 2a are reflected by the beam splitter 4 and converged by the converging lens 5 on spots 9a, 9e, and 9f, respectively, along an information track on the disk 6. The light reflected at these spots 9a, 9e, and 9f is converged by the converging lens 5 on the photodetector 10 after passing through the beam splitter 4. On the basis of the outputs of the photodetector 10, the reproduction and recording of information and the adjustment of the focusing and tracking errors are effected as described above in reference to FIGS. 1 through 4.

On the other hand, the peripheral pencils of rays 21a and 21b incident on the peripheral diffraction domains 3a and 3b which undergo first order diffraction are diffracted toward the optical axis O' of the laser diode 1 in the Z direction perpendicular to the recording surface of the disk 6, as shown in FIG. 18 and FIG. 19(a). These rays 21a and 21b, after being changed in their propagation directions by the peripheral domains 3a and 3b of the diffraction grating 3, are reflected by the beam splitter 4 and, after passing through the opening of the aperture limiter 16, converged by the converging lens 5 on the two spots 17a and 17b on the recording surface of the disk 6 which are situated to either side of the information reading spot 9a along the X direction perpendicular to the Y direction of the tracks on the disk 6. The rays of light reflected at these side spots 17a and 17b are converged by the converging lens 5 on the two photodetectors 53a and 53b, respectively. These photodetectors 53a and 53b are partitioned into two cells. Namely photodetector 53a is partitioned into cells P1 and P2 and photodetector 53b is partitioned into cells P3 and P4.

As shown in FIG. 18, the outputs of cells P1 and P3 are coupled to an input of a subtractor 61, while those of cells P2 and P4 are coupled to the other input the same subtractor 61. Thus, subtractor 61 outputs the tilt detection signal 63, which is equal to the value (P1+P3)−(P2+P4). The photodetectors 53a and 53b are set in such a way that when the optical axis O of the converging lens 5 is perpendicular to the recording surface of the disk 6, the amounts of light incident on cells P1 and P2 are equal to each other and the amounts of light incident on cells P2 and P4 are equal to each other. Since the pencils of rays 22a and 22b reflected from the spots 17a and 17b are translated positively or negatively in the X direction according as the recording surface of the disk 6 is tilted around the Y direction, the tilt detection signal 63 is proportional to the amount of tilting of the disk 6. Thus, the motor 36 is similar to the one described above and adjusts the attitude of the optical head supporting box in response to the tilt detection signal supplied thereto via a phase compensation circuit 35.

Figure 20:
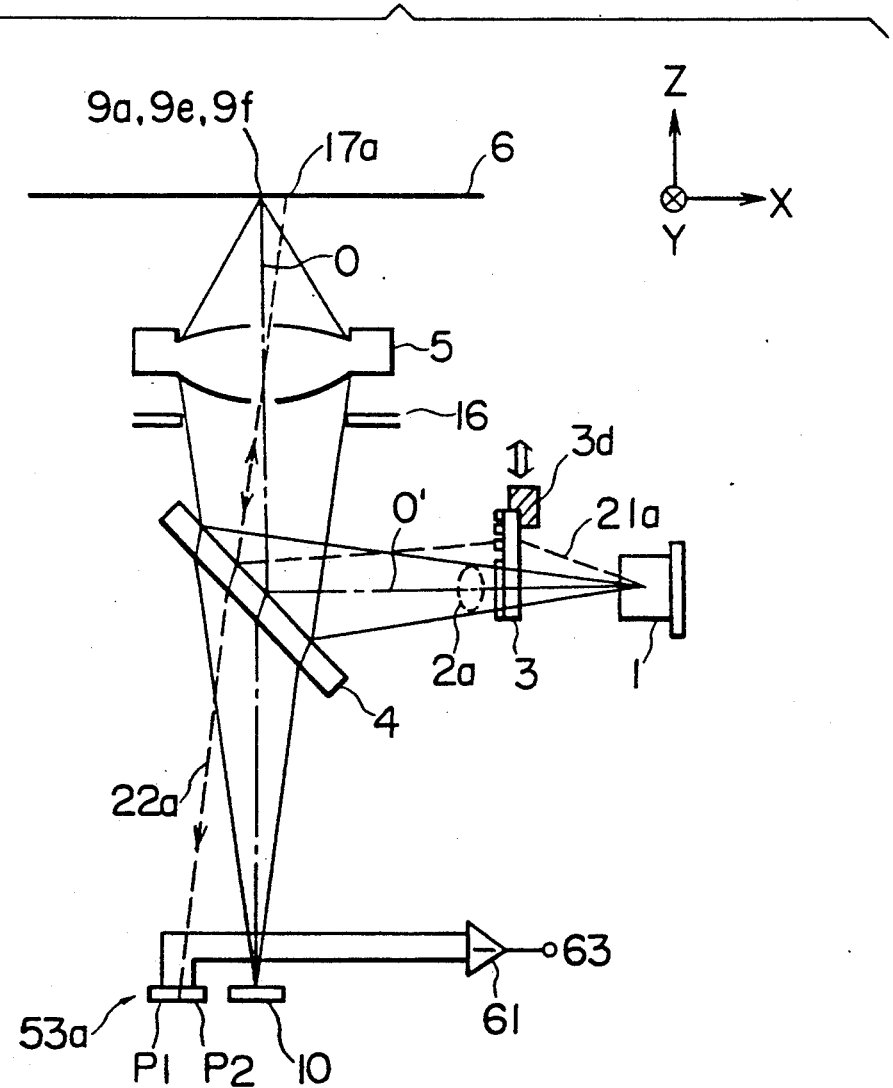
FIG. 20 is a schematic side view of an optical head device similar to that of FIG. 18, wherein a diffraction grating is provided with a peripheral diffraction domain whose grating interval varies gradually.

In the case of the embodiment of FIG. 18, the positions of the photodetectors 53a and 53b must be adjusted so that the output 63 of the subtractor 61 becomes equal to zero when the disk 6 is not tilted with respect to the optical axis O of the converging lens 5. Thus, the photodetectors 53a and 53b should be provided with a position adjustment mechanism which is independent of the adjustment mechanism for the photodetector 10. FIG. 20 shows an embodiment wherein photodetector 53a for the tilt detection may be mounted on the same substrate board as the photodetector 10 for the information reproduction and for focusing and tracking error detection.

Figure 21A:
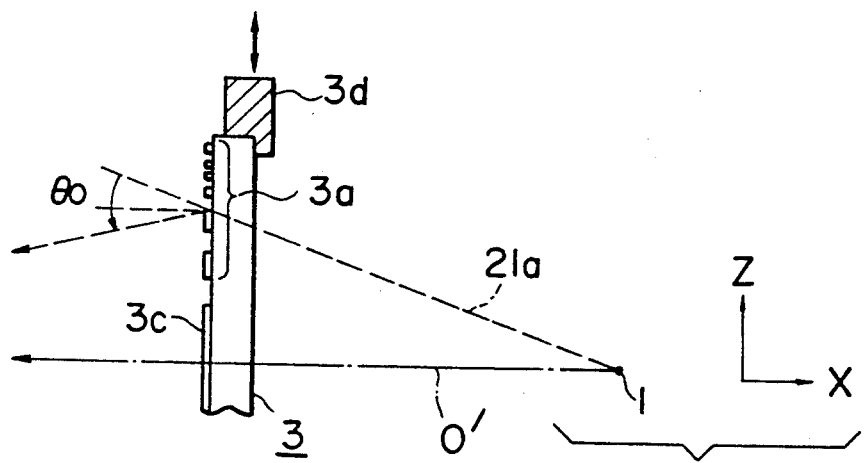
FIGS. 21(a), 21(b) and 21(c) are enlarged side views of the device of FIG. 20, showing the peripheral diffraction domain of the diffraction grating in three different positions.
Figure 21B:
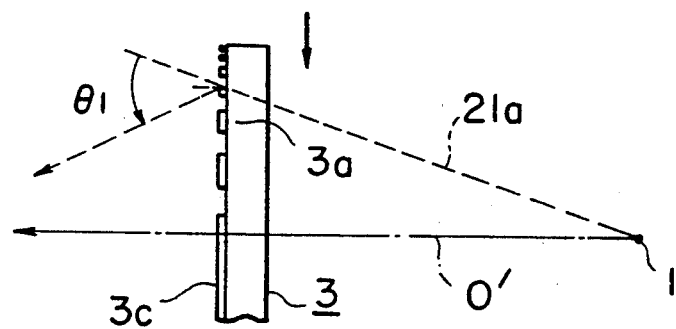
Figure 21C:
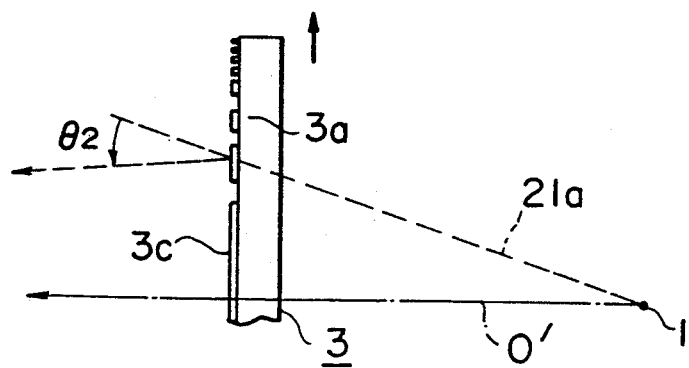

The diffraction grating 3 of the embodiment of FIG. 20 comprises only one peripheral diffraction domain 3a in addition to the central diffraction domain 3c. As shown in greater detail in FIGS. 21(a) through 21(c), the grating interval of the peripheral diffraction domain 3a decreases gradually toward the periphery in the Z direction perpendicular to the recording surface of the disk 6. Further, the diffraction grating 3 is provided with a position adjustment mechanism 3d for adjusting the position of the diffraction grating 3 along the Z direction. The angle of diffracted light of the first order will be denoted by $\Theta_0$ when the peripheral pencil of rays 21a falls on the central portion of the peripheral domain 3a as shown in FIG. 21(a). When the diffraction grating 3 is moved slightly downward (i.e. in the −Z direction) by the adjustment mechanism 3d to a position shown in FIG. 21(b), then the angle $\Theta_1$ of diffraction of first order becomes greater than the angle $\Theta_0$, since the pencil of rays 21a falls on a portion of the domain 3a where the grating interval is smaller. On the other hand, when the diffraction grating 3 is moved slightly upward (i.e. in the +Z direction) by the adjustment mechanism 3d to the position shown in FIG. 21(c), then the angle $\Theta_2$ of diffraction of first order becomes smaller than the angle $\Theta_0$, since the pencil of rays 21a falls on a portion of the domain 3a where the grating interval is greater.

As shown by dashed lines in FIG. 20, the pencil of rays 21a diffracted at the peripheral domain 3a of the diffraction grating 3 is reflected by the beam splitter 4 to fall on a side spot 17a on the disk 6 via the converging lens 5. The light reflected at the side spot 17a is converged by the converging lens 5, and after passing through the beam splitter falls on the photodetector 53a partitioned into two cells P1 and P2. The outputs of cells P1 and P2 are coupled to a subtractor 61 which outputs tilt detection signal 63 proportional to the difference (P1−P2) between the two outputs. The adjustment of the position in the X direction of the pencil of rays 22a reflected from the spot 17a to the photodetector 53a, for the purpose of reducing the offset of the tilt detection signal to zero, can be effected by means of the mechanism 3d which adjusts the position of the diffraction grating 3 in the Z direction. Thus, even if the photodetector 53a is mounted on the same substrate board as the photodetector 10, the adjustment of the offset of the tilt detection signal 63 which may take place when the disk 6 is not tilted can be effected independently by the adjustment mechanism 3d. By forming the photodetectors 10 and 53a integrally on the same semiconductor substrate, the optical head device can be made smaller. In the above described diffraction grating 3, the width of the central domain 3c in the Z direction is designed to be wide enough so that the effective pencil of rays 2 falls thereon and passes entirely therethrough over the whole range of the adjustment of the diffraction grating 3 via the mechanism 3d in the Z direction Z. Thus, the adjustment of the diffraction grating 3 via the mechanism 3d has no adverse effects on the recording and reproducing characteristics.

In the embodiment of FIG. 20, only one peripheral diffraction domain 3a is disposed at the side of the central domain 3c. However, the same principle of grating interval variation can be appied to the case where two peripheral diffraction domains 3a and 3b are disposed at both sides of the central domain 3c in the Z direction, as in the case of the optical head device of FIG. 18.

Figure 22:
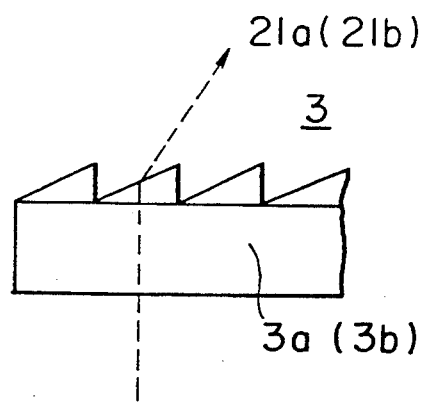
FIG. 22 shows a preferred form of portions of the section of the peripheral domains of the diffraction grating of the optical head devices of FIGS. 18 and 20.

The diffraction grating of peripheral diffraction domains 3a and 3b preferably has a saw-tooth shaped cross section as shown in FIG. 22. This shape enhances the effectiveness of diffraction. Thus, by adopting such a form, the sensitivity of tilt detection can be further improved.

C) Devices with Mirrors for Reflecting Peripheral Rays

Figure 23:
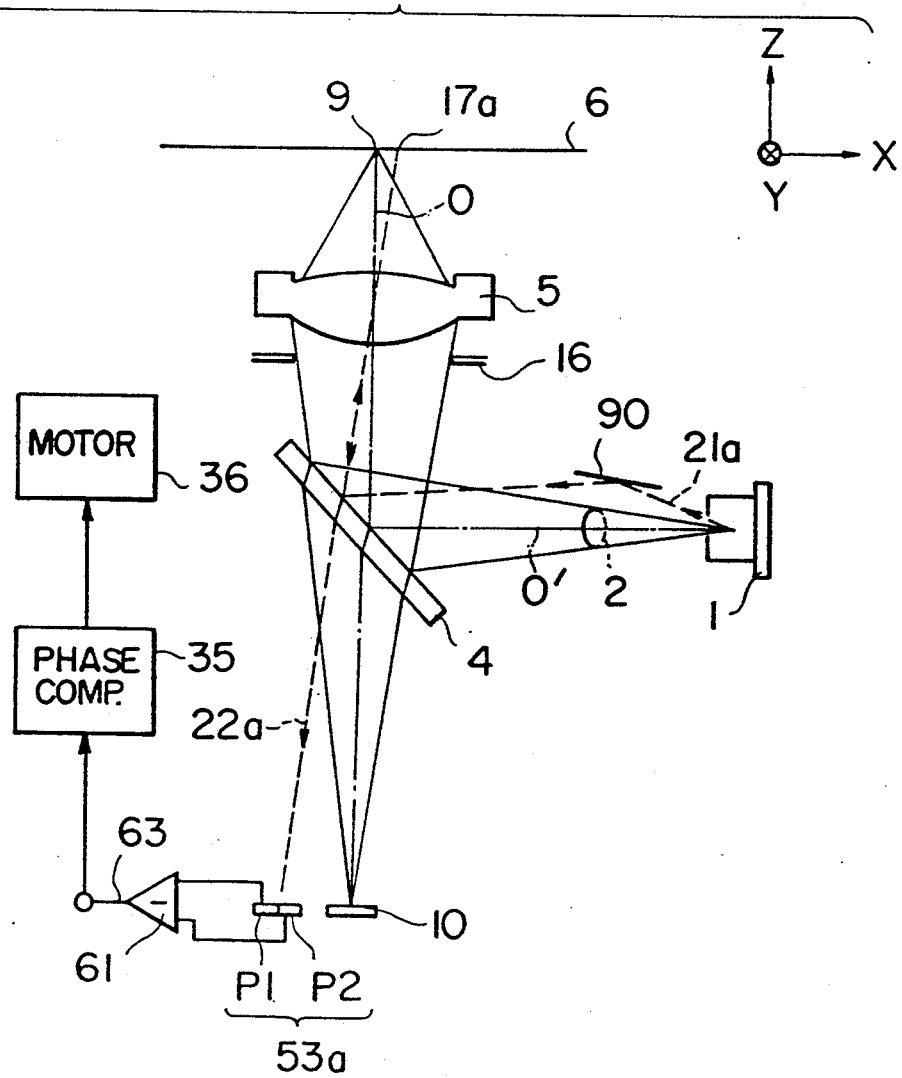
FIG. 23 is a schematic side view of an optical head device according to a third aspect of this invention, which is provided with a mirror for reflecting a peripheral portion of the light emitted from the laser diode.

FIG. 23 shows an embodiment which comprises a mirror 90 for reflecting and thereby deflecting a hitherto unused peripheral pencil of rays 21 for the purpose of tilt detection. In this embodiment, a plane mirror 90 is disposed, for example on a side of a diffraction grating (not shown) in the Z direction perpendicular to the surface of the disk 6, instead of the peripheral diffraction domain 3a in FIG. 20, to reflect a peripheral pencil of rays 21a toward the beam splitter 4. The pencil of rays 21a reflected by the mirror 90 and thereafter by the beam splitter 4 falls on a spot 17a on the disk 6 via the converging lens 5. The pencil of rays 22a reflected at the spot 17a is converged by the converging lens 5 through the beam splitter 4 on the photodetector 53a partitioned into two cells P1 and P2. A subtractor 61 coupled to the outputs of the cells P1 and P2 outputs a tilt detection signal 63 proportional to the difference (P1−P2) between the two outputs. Except for the provision of the mirror 90 for reflecting the light for tilt detection as described above, the optical head device of FIG. 23 is similar to the device of FIG. 20, both in its structure and operation, although the diffraction grating is not shown in FIG. 23.

Figure 24:
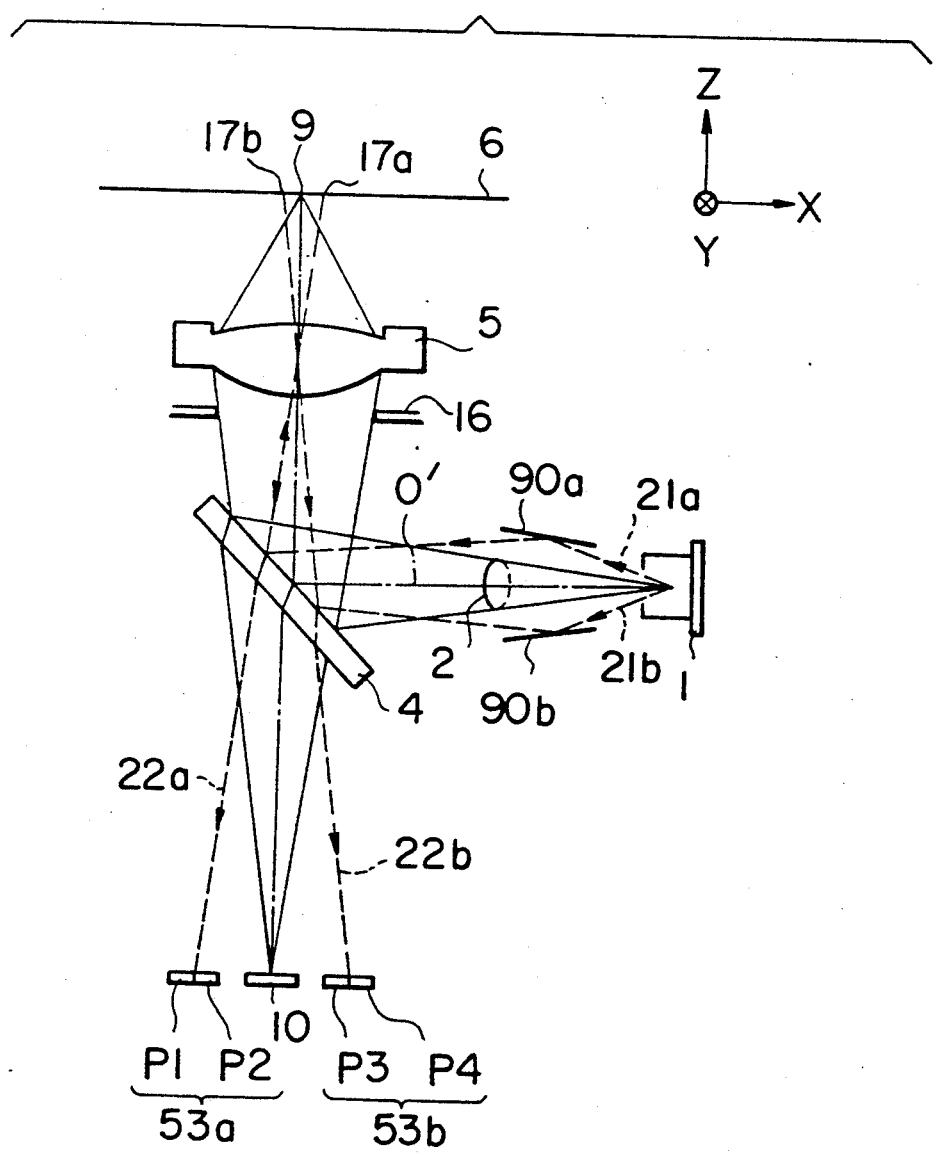
FIG. 24 is schematic side view of an optical head device similar to that of FIG. 23, which is provided with a pair of mirrors for reflecting peripheral portions of the light emitted from the laser diode.

FIG. 24 shows an embodiment which comprises two plane mirrors 90a and 90b for reflecting peripheral pencils of rays 21a and 21b emitted from the laser diode 1. Except that mirrors 90a and 90b are used instead of peripheral diffraction domains 3a and 3b, the optical head device of FIG. 24 is similar to the device of FIG. 18 both in structure and method of operation, and like reference numerals represent like or corresponding parts or portions. A tilt detection signal is obtained from the outputs of cells P1 through P4, via a circuit similar to that shown in FIG. 11 or 18. The tilt detection signal equals (P1−P2)+(P3−P4)=(P1+P3)−(P2+P4).

Figure 25A:
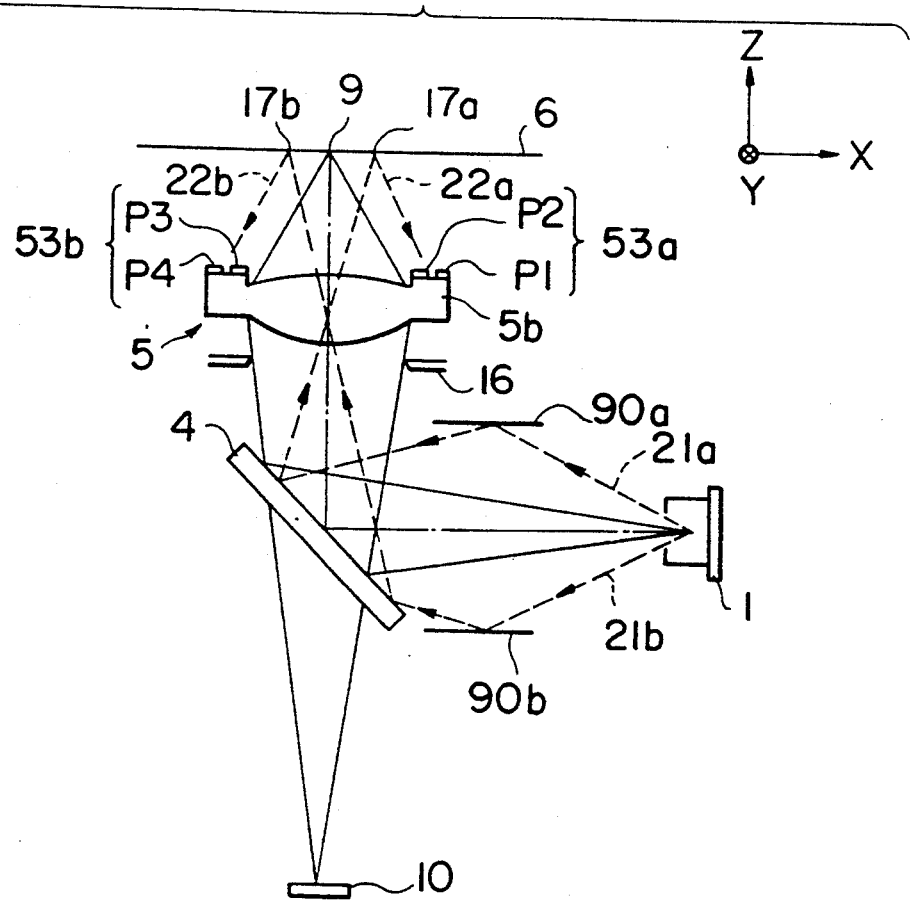
FIG. 25(a) is a side view of the optical head device and FIG. 25(b) is a plan view of the converging lens.
Figure 25B:
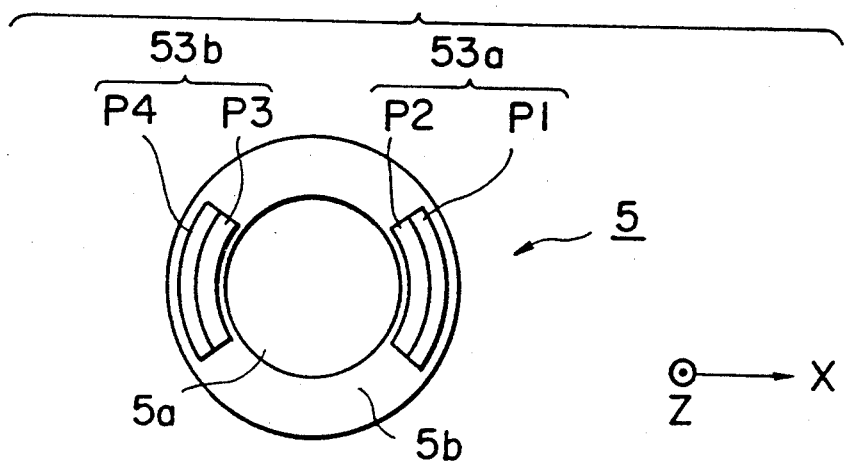

FIG. 25(a) shows another embodiment in which the cells P1 through P4 of the photodetectors 53a and 53b are disposed on the flange 5b of the converging lens 5. In the embodiments of FIGS. 23 and 24, the peripheral pencils of rays 21a and 21b for tilt detection are radiated and converged on the optical disk 6 via the converging lens 5, and those rays which have passed again through the converging lens 5 are detected by the photodetectors 53a and 53b. However, not all the rays reflected by the disk 6 return to the converging lens 5. In the embodiment of FIG. 25(a), mirrors 90a and 90b are disposed at such angles that the pencils of rays 21a and 21b reflected by them eventually fall on the photodetectors 53a and 53b situated on the flange 5b of the converging lens 5. Thus, the peripheral pencils of rays 21a and 21b (whose optical axes of which are shown by dashed lines in the figure) emitted from the laser diode 1 are reflected by the mirrors 90a and 90b and by the beam splitter 4, to fall on the converging lens 5 forming a substantial angle with the optical axis O of the converging lens 5. Thus, the pencils of rays 21a and 21b fall on spots 17a and 17b on the disk 6 which are spaced apart from the central spot 9 in the X direction perpendicular to the track direction (the Y direction). As a result, the zero order diffractive reflection rays 22a and 22b (the optical axes of which are shown by dashed lines in the figure) reflected at spots 17a and 17b fall on the photodetectors 53a and 53b disposed on the flange 5b of the converging lens 5 at either side thereof in the X direction as shown clearly in FIG. 25(b). The tilt detection signal is obtained from the outputs of the photodetector cells P1 through P4 of the photodetectors 53a and 53b as (P1+P3)−(P2+P4).

Figure 26:
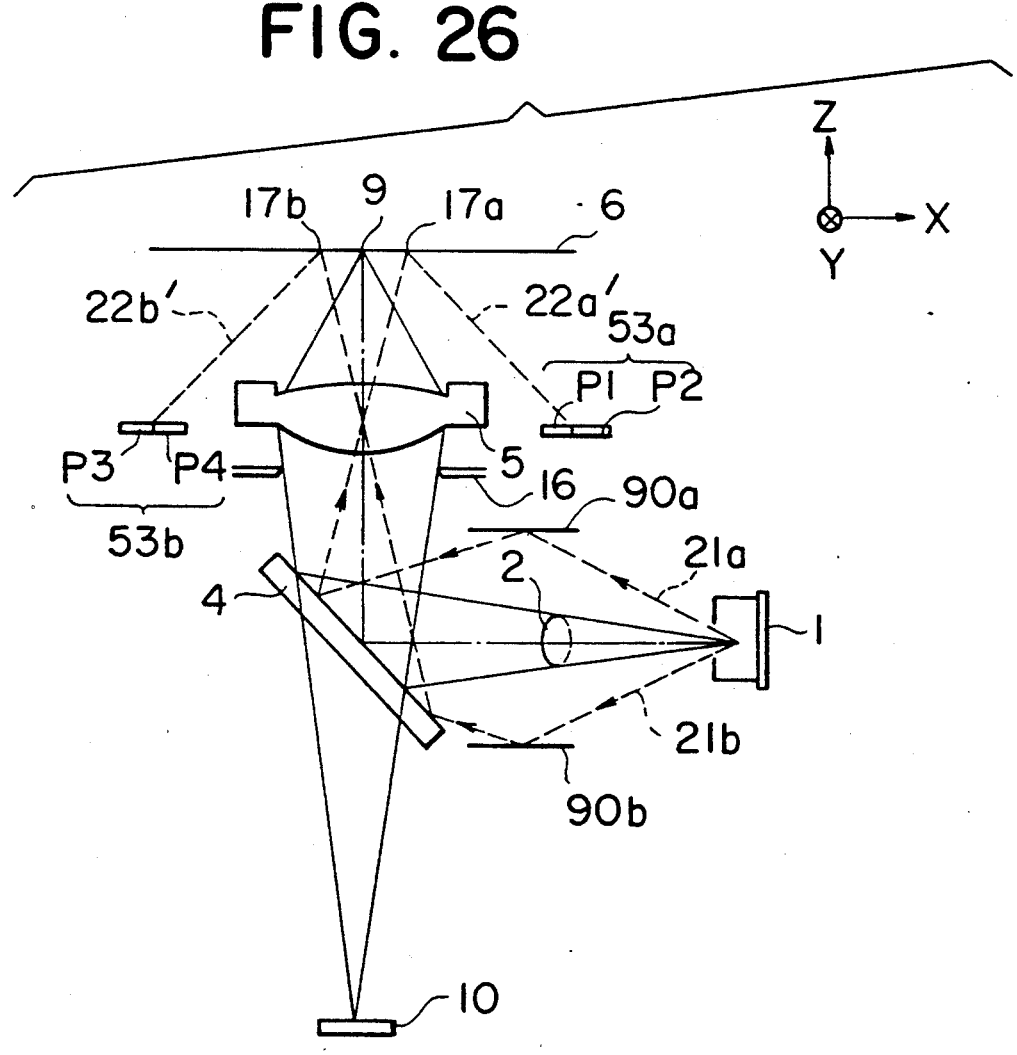
FIG. 26 is a side view of still another optical head device provided with a pair of reflective mirrors, wherein the photodetectors for tilt detection are disposed to either side of the converging lens.

FIG. 26 shows another embodiment in which the diffracted light of first order reflected at the recording surface of the optical disk 6 is utilized for tilt detection. Namely, on the recording surface of the disk 6 are formed a plurality of information tracks running parallel to each other in the Y direction. Thus, the recording surface of the disk 6 forms a kind of reflective diffraction grating. The peripheral pencils of rays 21a and 21b emitted from the laser diode 1 and reflected and converged on spots 17a and 17b on the recording surface of the disk 6 are therefore separated into zero and first order diffracted rays of light, wherein the first order diffraction rays 22a' and 22b' are diffracted away from the optical axis O of the converging lens 5 in the X direction and, to fall on the photodetectors 53a and 53b which are disposed to either side of the converging lens 5, at positions separated therefrom in the X direction.

Otherwise, the device of FIG. 26 is similar to that of FIG. 25(a).

In the embodiments of FIGS. 25(a) and 26, the pencils of rays 22a and 22b or 22a' and 22b' reflected at the spots 17a and 17b on the recording surface of the disk 6 are directed to the photodetectors 53a and 53b without being converged by the converging lens 5. Since these pencils of rays 22a and 22b or 22a' and 22b' are divergent pencils, they form radiation spots of a large diameter on the photodetectors 53a and 53b. It is preferred, however, for the purpose of receiving the rays 22a and 22b or 22a' and 22b' effectively and for the purpose of detecting the tilt of the disk 6 accurately that these pencils of rays form radiation spots which are smaller than the detection area of the cells P1 through P4 of the photodetectors 53a and 53b. For this purpose, the peripheral pencils of rays 21a and 21b are not converged at the spots 17a and 17b on the disk 6. The radiation spots made by the reflected pencils of rays 22a and 22b or 22a' and 22b' on the photodetectors 53a and 53b can be made smaller by collimating the pencils of rays 21a and 21b radiated on the spots 17a and 17b on the disk 6. For collimating the rays 21a and 21b on the reflection spots 17a and 17b, it suffices to make the mirrors 90a and 90b into convex reflective mirrors instead of plane mirrors. Then, the pencils of rays 22a and 22b or 22a' and 22b' undergoing reflective diffraction at the recording surface of the disk 6 are collimated and therefore can be detected effectively by the photodetectors 53a and 53b.

The central pencil of rays 2 must not have aberrations for the purpose of obtaining good recording and reproducing characteristics. However, even if the pencils of rays 21a and 21b for tilt detection have some aberrations, the tilt detection accuracy is not adversely affected by such aberrations. Thus, the mirrors 90a and 90b need not be formed by an expensive optical abrasion process. They may be formed of inexpensive glass plates, or they may be formed of resinous plastic plates or aluminum foils. Further, instead of utilizing separate parts as described above, the mirrors 90a and 90b may be formed of portions of the inner surface of the cylinder accommodating the laser diode 1 and the beam splitter 4.

Figure 27:
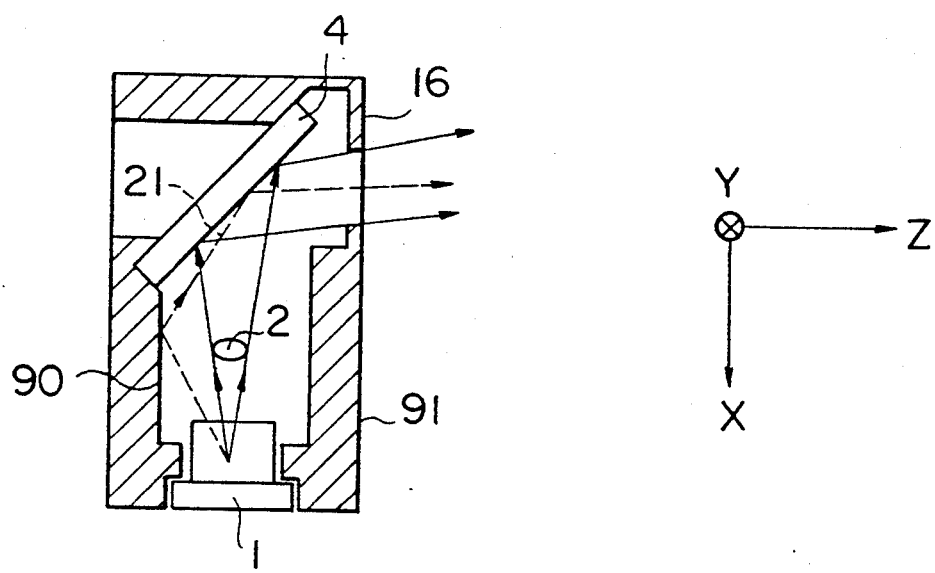
FIG. 27 shows a vertical section of a cylinder accommodating the laser diode and the beam splitter, wherein an inner side surface of the cylinder is polished to form a reflective mirror.

FIG. 27 shows an embodiment in which an inner side surface 90 of a cylinder 91 accommodating the laser diode 1 and the beam splitter 4 is formed into a plane and polished to reflect the peripheral pencil of rays 21 (shown by dashed lines) emitted from the laser diode 1. The structure of the cylinder 91 with polished plane inner side surfaces is applicable to the embodiments shown in FIGS. 23 through 26.

Figure 28:
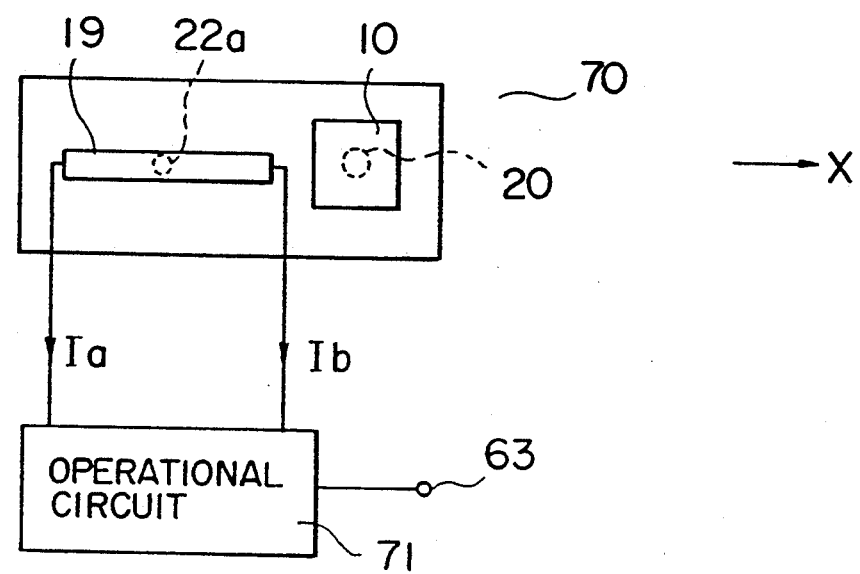
FIG. 28 shows an embodiment of a photodetector assembly including a linear position detector for tilt detection.

FIG. 28 shows an embodiment in which a semiconductor linear position detector 19 is utilized instead of the photodetectors 53a and 53b.

In the case of the optical head devices of FIGS. 23 and 24, the photodetector 10 for the information reproduction and the photodetectors 53a and 53b for the tilt detection are disposed on separate substrates in spite of the fact that they are positioned adjacent to each other. This is due to the need to adjust the photodetectors 53a and 53b in their positions independently of the position of the photodetector 10. Namely, in these embodiments, the positions of the photodetectors 53a and 53b in the X direction must be adjusted so that the outputs of cells P1 and P2 of photodetector 53a or the outputs of cells P3 and P4 of photodetector 53b become equal when the optical axis of the converging lens 5 is perpendicular to the recording surface of the disk 6.

In the case of the photodetector assembly 70 of FIG. 28, however, the position detector 19 for tilt detection and the photodetector 10 for information reproduction can be mounted on the same substrate 70a because adjustment of the detector 19 in the X direction is unnecessary. The reason therefor is as follows.

Let the assembly 70 of FIG. 28 be disposed in the optical head device of FIG. 23 instead of the photodetectors 10 and 53a and the subtractor 61. Then, the position detector 19 outputs currents Ia and Ib from the two ends thereof the magnitudes of which correspond to the central position in the X direction of the incident pencil of rays 22a from the reflection spot 17a on the disk 6. More precisely, the magnitudes of currents Ia and Ib are such that the normalized differential outputs of the currents Ia and Ib, $(Ia-Ib)/(Ia+Ib)$, is proportional to the displacement of the center of the incident light spot 22a in the X direction. When the spot 22a is at the center of the position detector 19, the two currents Ia and Ib are equal to each other (Ia=Ib) and hence the normalized differential output vanishes.

Figure 29:
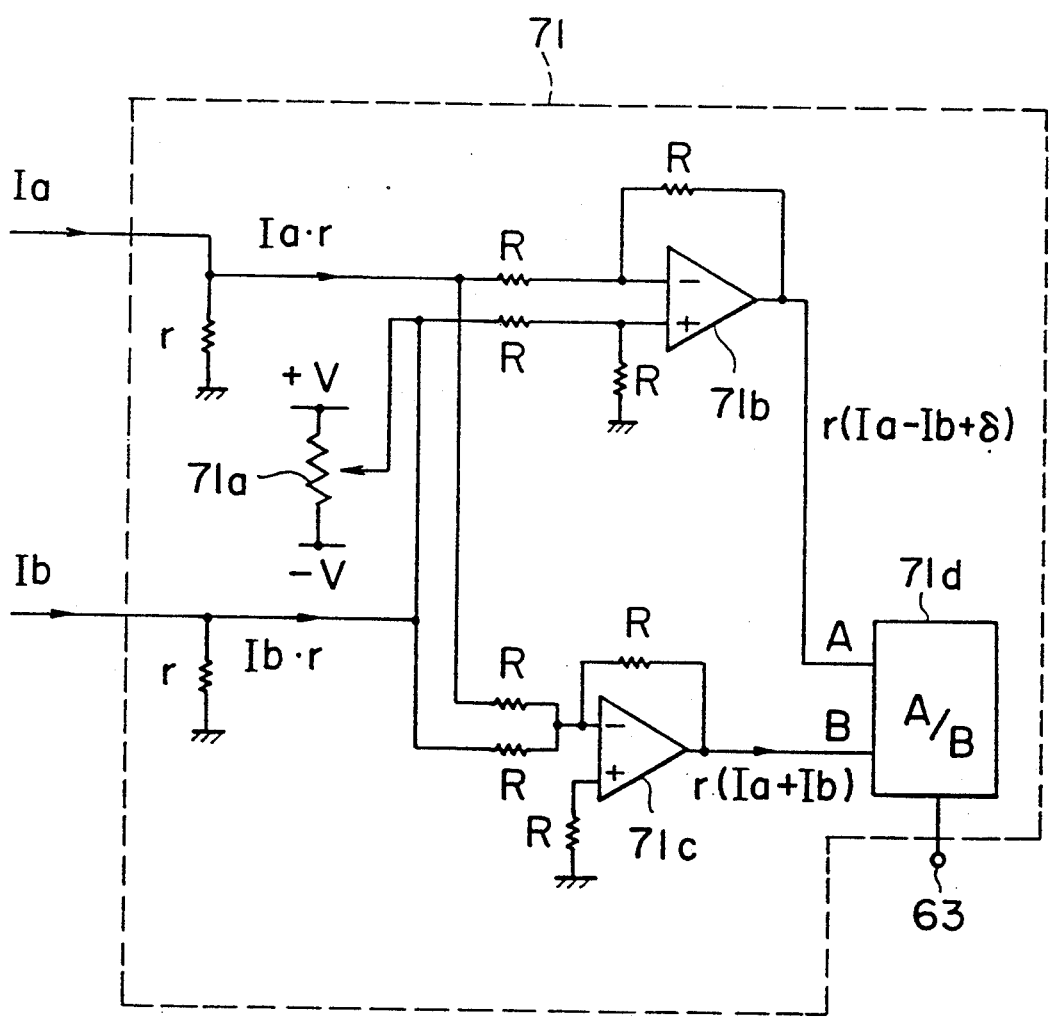
FIG. 29 is a circuit diagram of the calculation circuit of the assembly of FIG. 28.

Thus, fundamentally, the operational circuit 71 calculates and outputs the value $(Ia-Ib)/(Ia+Ib)$ as the tilt detection signal 63. It also comprises means for adjusting the offset of the outputs of the detector 19. Namely, the position of the light spot 22a may be deviated from the center of the detector 19 when the disk 6 is not tilted with respect to the optical axis of the converging lens 5. In this case, Ia is not equal to Ib when there is no tilting and hence there arises an offset in the normalized differential output. Thus, the circuit 71 comprises means for correcting this offset. Namely, as shown in FIG. 29, the circuit 71 comprises a variable resistor 71a, by means of which the operational amplifier 71b outputs $A=r\cdot(Ia-Ib+\delta)$, wherein r is a constant and the value of $\delta$ is adjusted by means of the variable resistor 71a. On the other hand, the operational amplifier 71c outputs $B=r\cdot(Ia+Ib)$. Thus, the division circuit 71d outputs the ratio $A/B=(Ia-Ib+\delta)/(Ia+Ib)$ as the tilt detection signal 63. Thus, by the adjustment of the value of $\delta$ by means of the variable resistor 71a, the offset of the detector 19 can be reduced to zero.

D) Devices with Mirrors for Reflecting Split Rays

Figure 30:
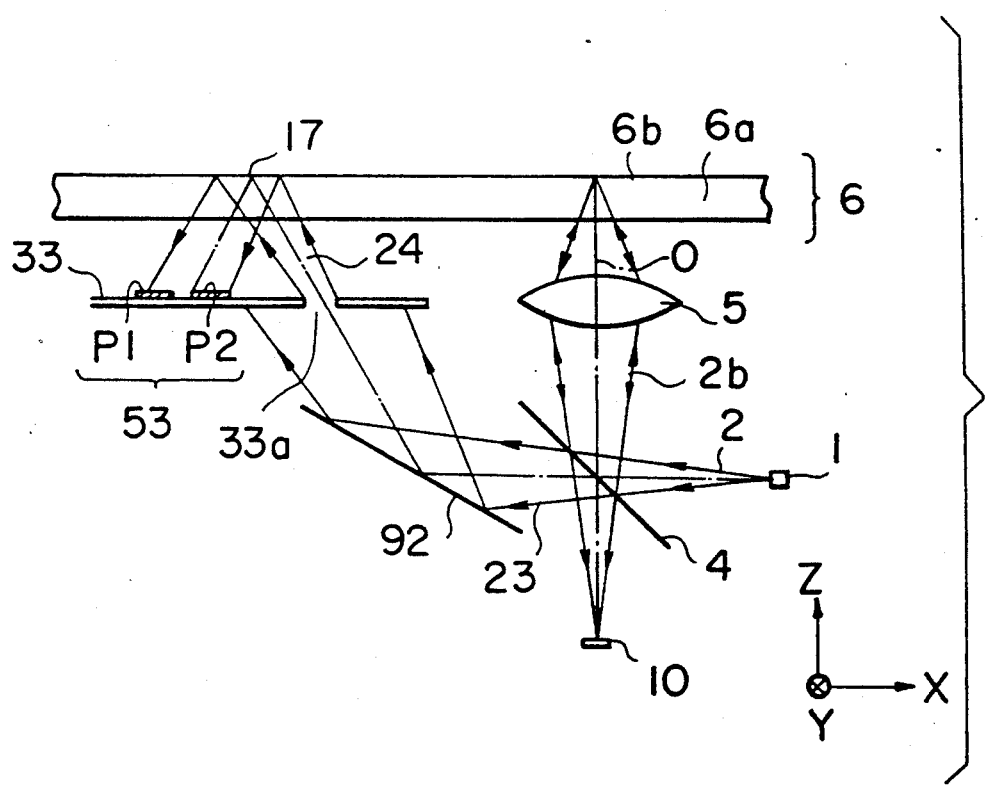
FIG. 30 is a schematic sectional side view of an optical head device according to a fourth aspect of this invention, which is provided with a mirror for reflecting the light emitted from the laser diode and passing through the beam splitter, for the purpose of tilt detection.
Figure 31:
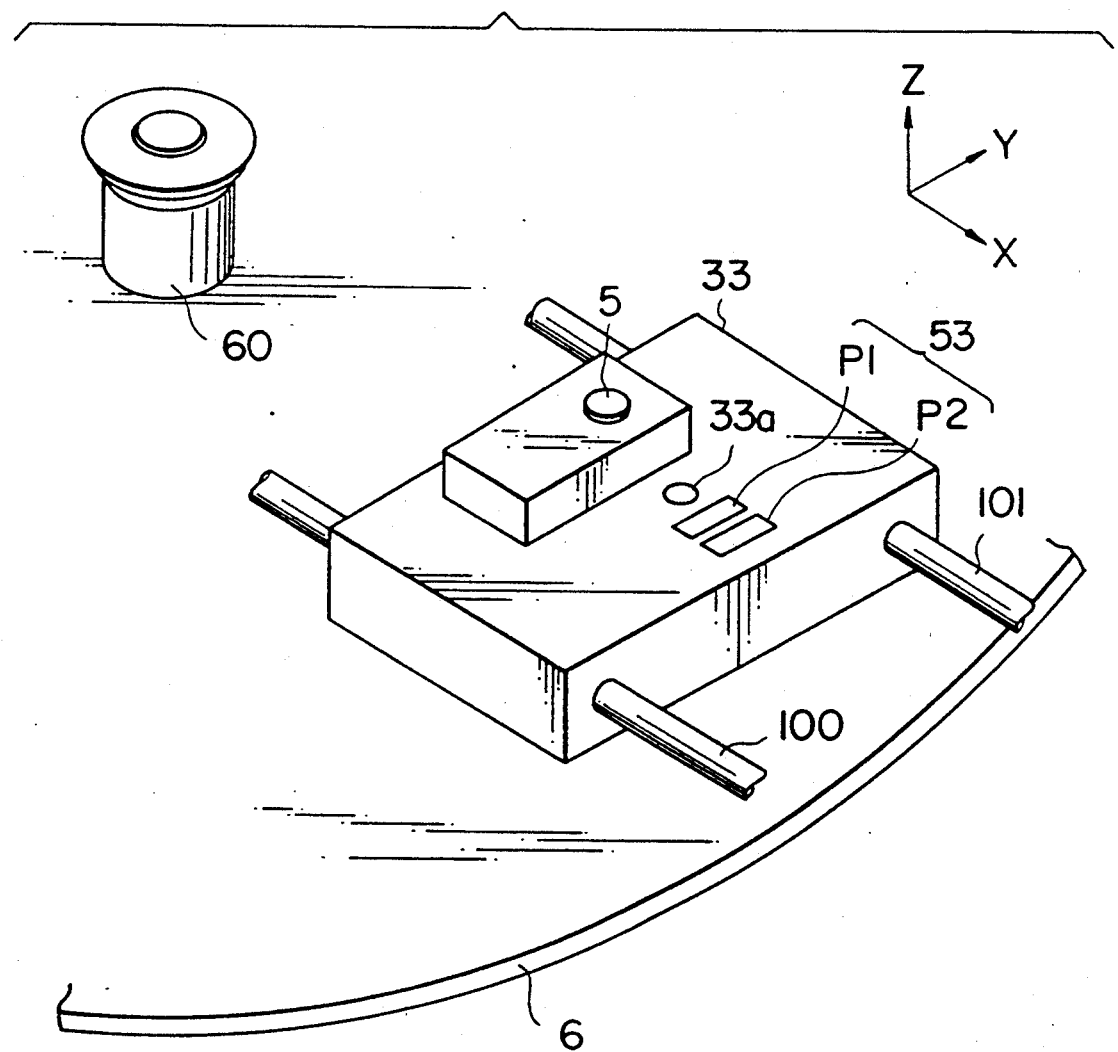
FIG. 31 is a perspective view of the optical head device of FIG. 30.

FIGS. 30 and 31 show an embodiment which comprises a mirror 92 for reflecting the pencil of rays 23 for the purpose of tilt detection. The pencil of rays 23 is that portion of the rays 2 emitted from the laser diode 1 which passes through the beam splitter 4 and thus is separated from the rays 2b reflected by the beam splitter 4 toward the converging lens 5 to be utilized for information reproduction. Thus, the pencil of rays 23 emitted from the laser diode 1 and transmitted through the beam splitter 4 is reflected by the mirror 92 to fall on a side spot 17 on the recording surface 6b of the disk 6 via an opening 33a formed in the upper surface of the head supporting box 33. The pencil of rays 24 reflected by the mirror 92 falls on the spot 17 on the recording surface 6b situated to a side of the information reading spot 9 in the X direction. The light reflected at the side spot 17 falls on the photodetector 53 partitioned into two cells P1 and P2, which are disposed on the upper surface of the head supporting box 33. Reference numerals 100 and 101 in FIG. 31 designate a pair of shafts for advancing the optical head in the X direction.

As best shown in FIG. 31, the opening 33a and the cells P1 and P2 are positioned along the radial direction (the X direction) upon the upper surface of the box 33 so that the tilting of the disk 6 in the radial direction can be detected accurately. Further, it is preferred that the opening 33a and the cells P1 and P2 be positioned as near to the converging lens 5 as possible, since the tilting of the recording surface of the disk 6 just above the converging lens 5 is to be detected by the photodetector 53. Head advancing shafts 100 and 101 have been shown in FIG. 31. However, this invention is applicable to optical head devices which include a swing arm type advancing mechanism.

Figure 32:
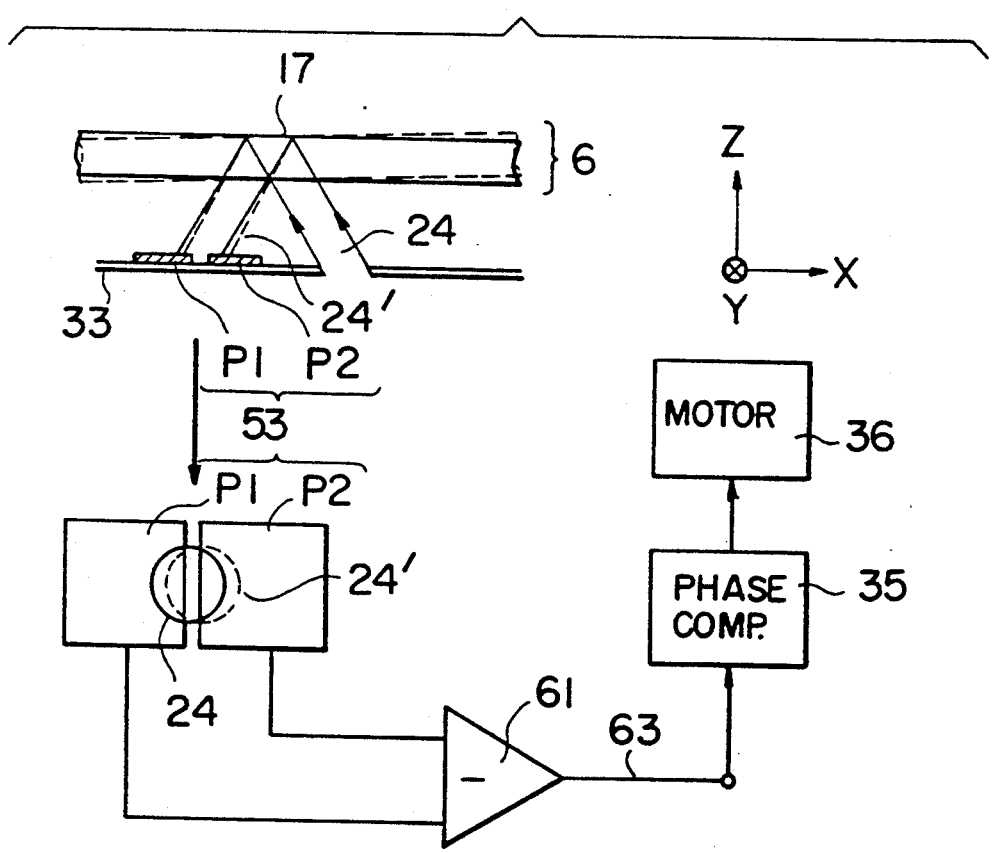
FIG. 32 is a sectional view of a portion of the device of FIG. 30 together with a diagram of a circuit for generating a tilt detection signal.

As shown in FIG. 32, the tilt detection signal 63 can be obtained from the outputs of the two cells P1 and P2 via a subtractor 61 as (P1−P2). As shown by solid lines in the figure, the pencil of rays 24 reflected at the side spot 17 falls evenly across the two photodetector cells P1 and P2 when the optical axis O of the converging lens 5 is perpendicular to the recording surface 6b of the disk 6. However, when the disk 6 is tilted as shown by dashed lines in the figure, the pencil of rays 24 is translated in the X direction to a position indicated by 24'. On the other hand, when the disk 6 is tilted in the other direction, the pencil of rays 24 is translated in the opposite direction. Thus, the subtractor or differential amplifier 61 outputs the tilt detection signal 63 which is proportional to the tilting of the disk 6 with respect to the optical axis of the converging lens 5 of the optical head. In response to the signal 63 supplied via the phase compensation circuit 35, the motor 35 adjusts the attitude of the box 33 to correct the tilting of the disk with respect to the optical head.

Figure 1:
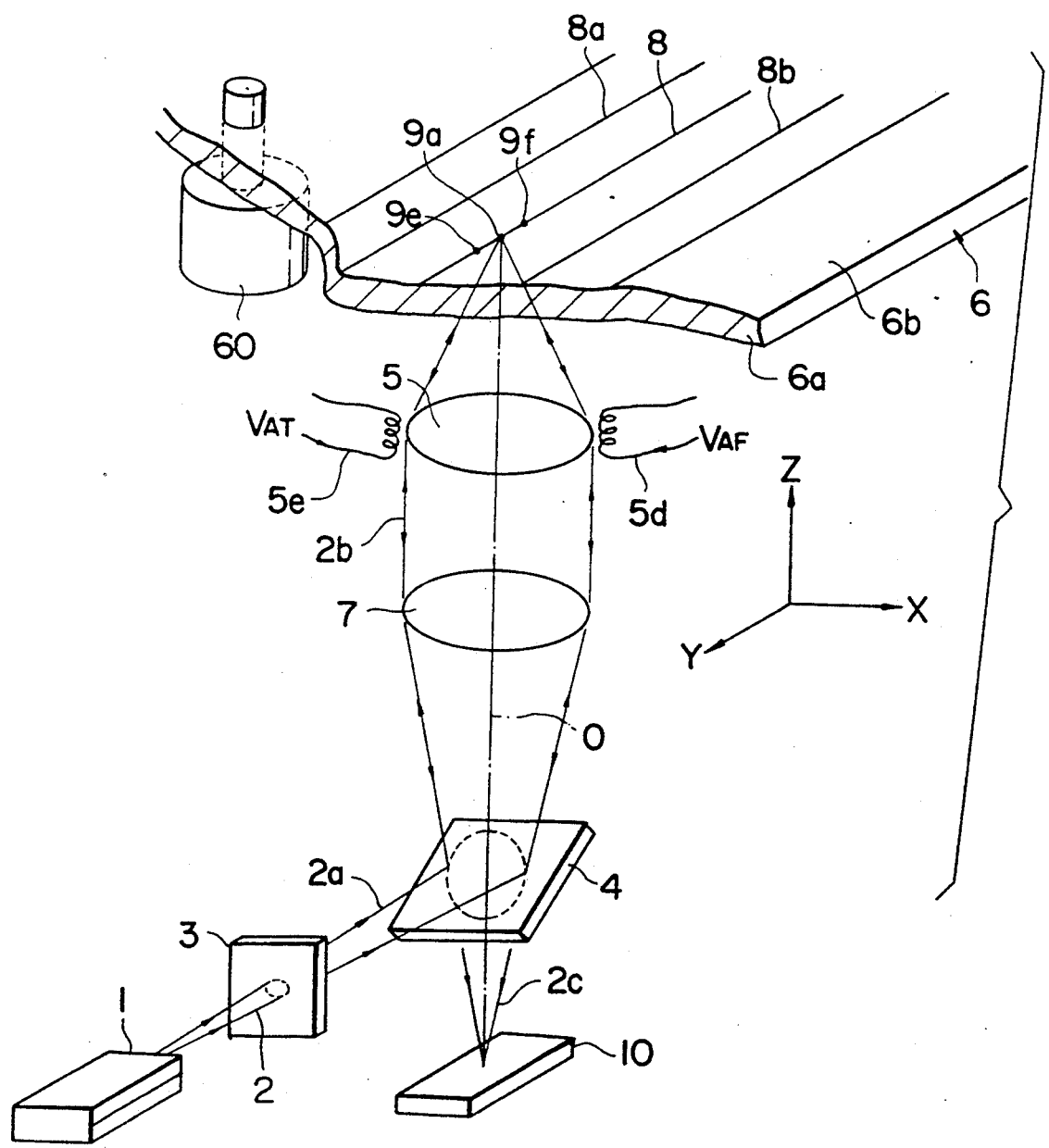
FIG. 1 is a perspective view of an optical head device comprising tracking and focusing servo mechanisms.
Figure 2:
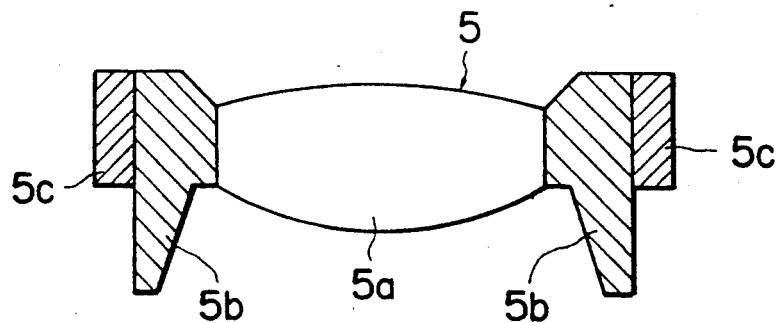
FIG. 2 shows a vertical section of the converging lens of the optical head device of FIG. 1 along its optical axis.
Figure 3:
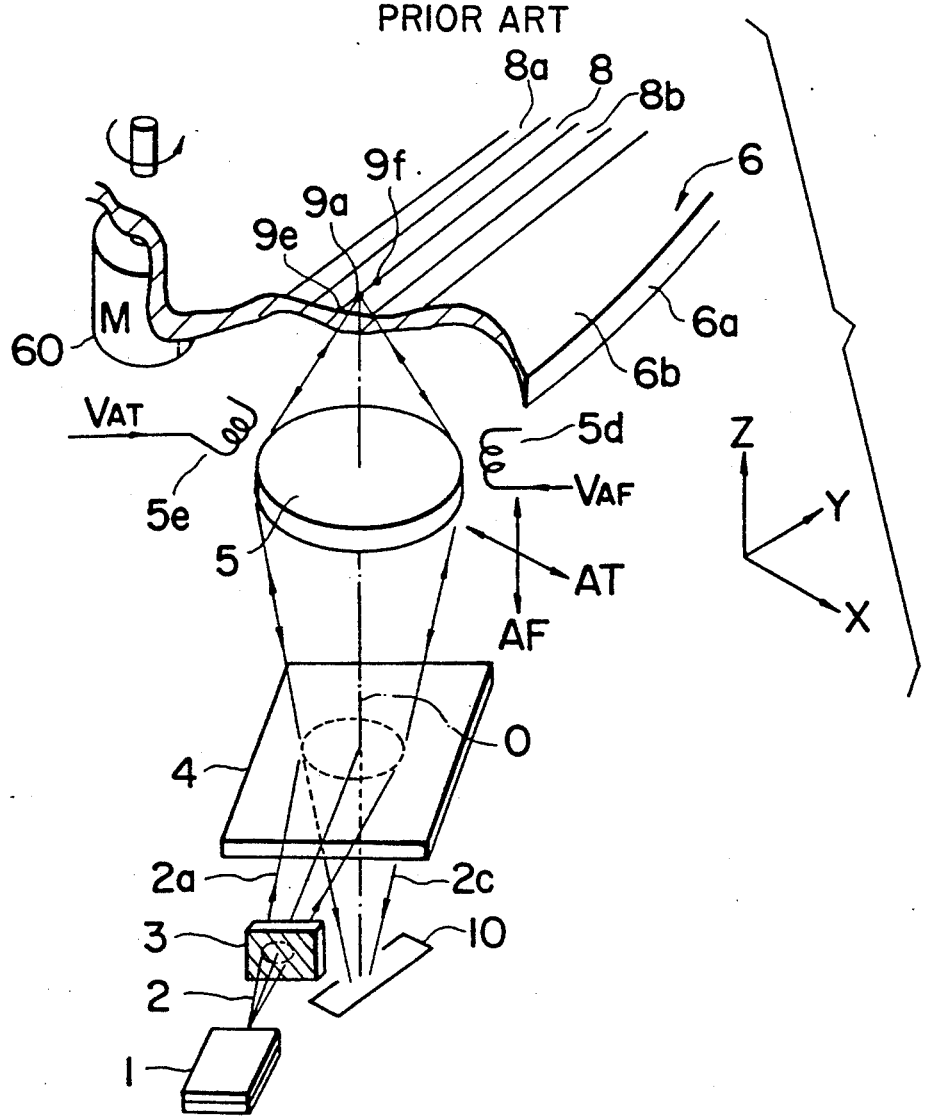
FIG. 3 is a perspective view of another optical head device which is similar to that of FIG. 1, but in which a collimating lens is not utilized.
Figure 7A:
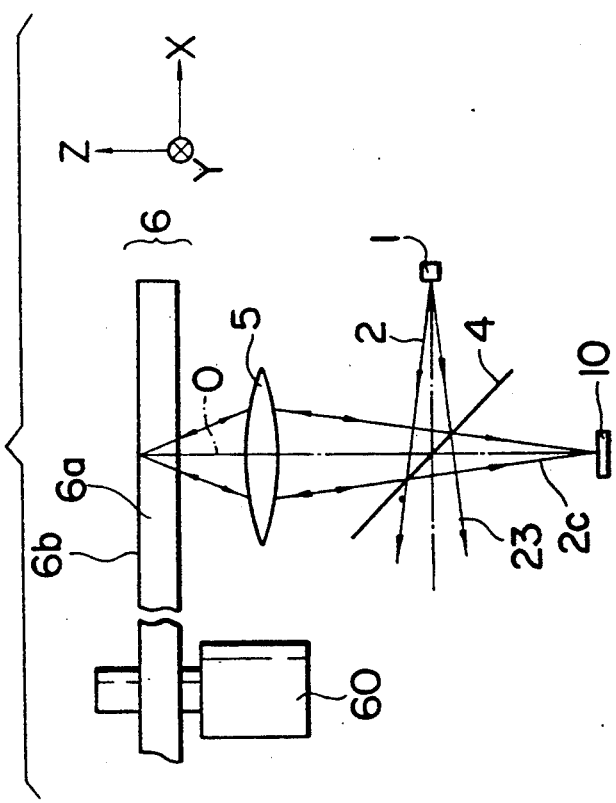
FIGS. 7(a) and 7(b) show two types of optical systems of the optical head device, in which the optical axis of the laser diode coincides with that of the converging lens (shown in (a)) or is at right angles therewith (shown in (b))
Figure 7B:
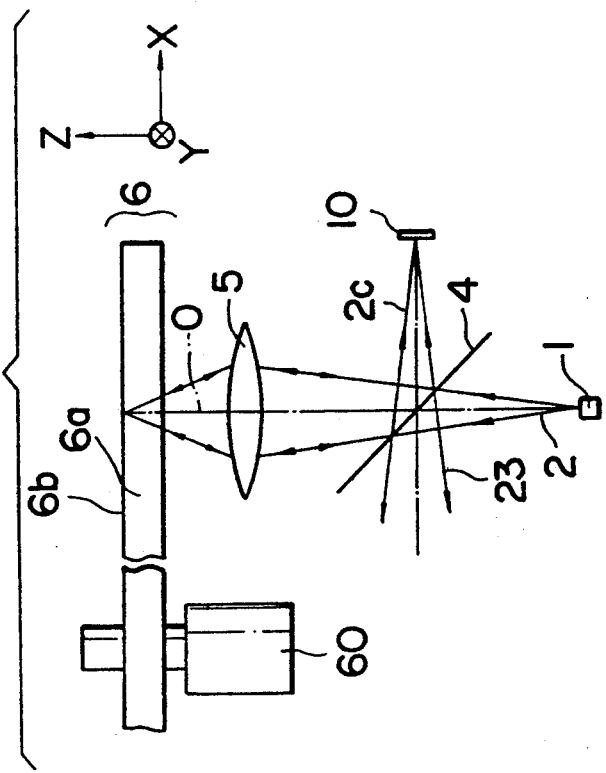

The optical head of FIGS. 30 through 32 is otherwise similar in structure and organization to those of FIGS. 1 and 3 described above. It is noted that the principle of utilizing the rays split by the beam splitter 4 for the purpose of tilt detection by means of a mirror is also applicable to the optical head shown in FIG. 7(a). In this case, a mirror corresponding to the mirror 92 of FIG. 30 is disposed for reflecting the pencil of rays 23 reflected by the beam splitter 4.

Figure 33:
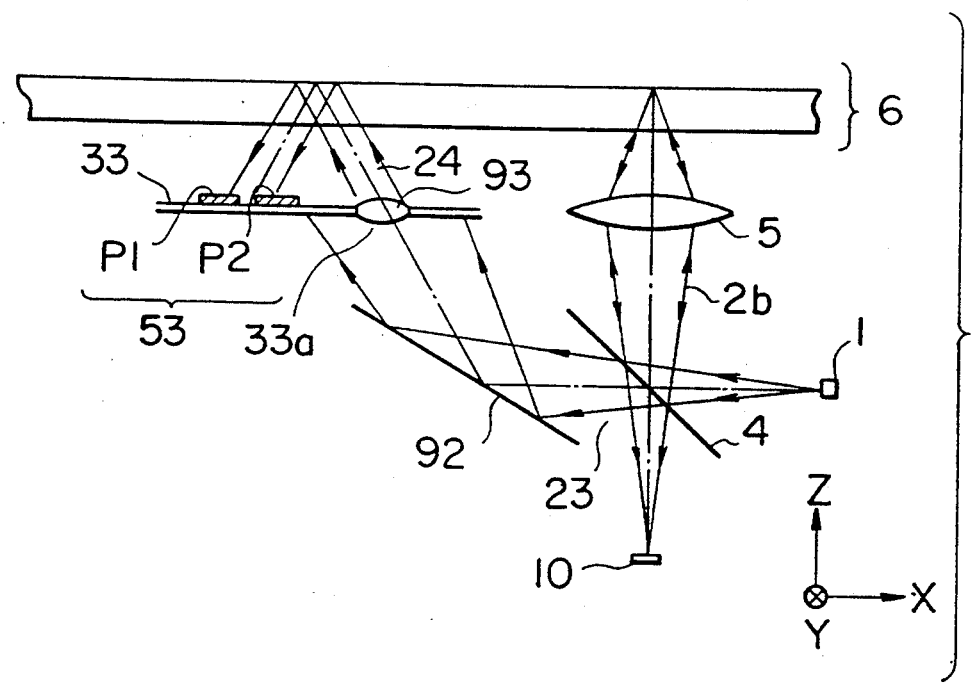
FIG. 33 is a side view of an optical head device similar to that of FIG. 30, which comprises a convex lens for collimating light reflected by the mirror for the tilt detection.

FIG. 33 shows another embodiment comprising a mirror 92 for reflecting the split rays. In this embodiment, a convex lens 93 is disposed in the opening 33a in the box 33 for collimating the divergent pencil of rays 23 into collimated rays 24. Thus, the effectiveness and accuracy of tilt detection are enhanced in this embodiment. Otherwise, this embodiment is similar to that of FIGS. 30 through 32.

Figure 34:
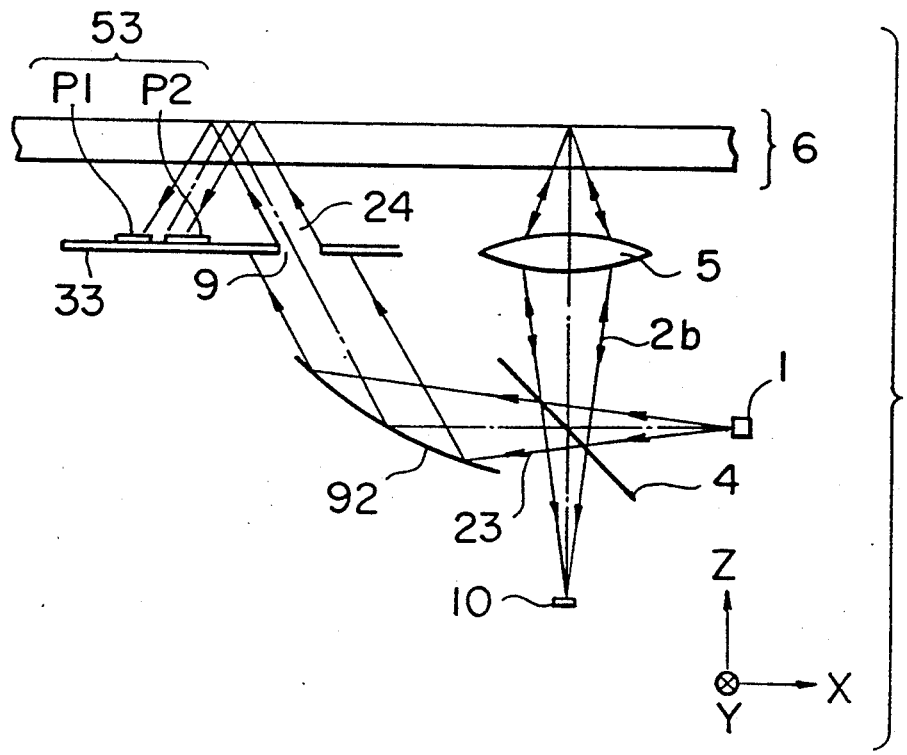
FIG. 34 is a side view of another optical head device which is similar to that of FIG. 30, but in which the mirror for tilt detection is concave.

FIG. 34 shows still another embodiment in which the mirror 92 for reflecting the split rays is formed into a concave form to collimate the diverging pencil of rays 23 into collimated rays 24. Thus, the effectiveness and accuracy of tilt detection is also enhanced in this embodiment.

Figure 35:
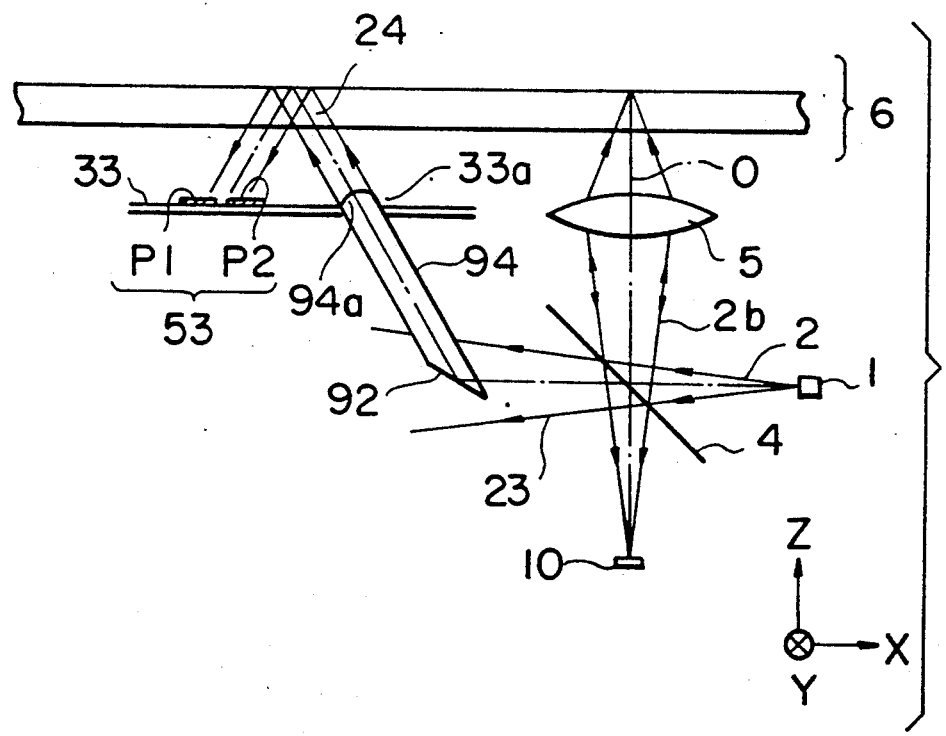
FIG. 35 is a side view of still another optical head device similar to that of FIG. 30, provided with an optical waveguide in which the lower end surface which forms a mirror.

FIG. 35 shows a still further embodiment which comprises an optical waveguide 94 having a lower end surface which forms a reflective mirror surface 92. The upper end surface 94a may be plane. However, it is preferred to have a convex form as shown in the figure to collimate the pencil of rays 24 passing therethrough. The optical waveguide 93 may be formed, for example, of an inexpensive plastic resin bar, since only the intensity of the rays 24 is measured by the photodetector 53 and the qualities, such as aberrations, of the rays 24 do not matter in tilt detection.

In reference to FIGS. 33 through 35, the rays 24 are described as collimated parallel rays. However, it is not necessary that they be parallel rays. For example, when the rays 24 are converging, the sensitivity of tilt detection may be further enhanced and the cells P1 and P2 can be made smaller. Thus, the angle of convergence (or collimation) of the rays 24 falling on the disk 6 may be selected to be any preferred value.

While description has been made of the particular embodiments according to four aspects A) through D) of this invention, it will be understood that many modifications may be resorted to without departing from the spirit of the invention. The appended claims are contemplated to cover any such modifications as fall within the ture spirit and scope of this invention.

What is claimed is:

1. An optical head devise for recording and reproducing information on a recording surface of an optical disk comprising:
   a light source for emitting rays of light;
   a converging lens for converging a central portion of the rays emitted from the light source on an information track on the recording surface of the optical disk, wherein rays of light converged on the recording surface of the optical disk are reflected therefrom to form reflected rays of light;
   a beam splitter for separating from the rays emitted from the light source the reflected rays of light that are reflected from the recording surface of the optical disk and transmitted again through the converging lens;
   a first photodetector for receiving and detecting the reflected rays of light that have passed through the converging lens and have been separated by the beam splitter, thereby reproducing information recorded on the track on the optical disk;
   refracting means, disposed at a peripheral portion of the converging lens and integral therewith, for refracting a peripheral portion of the rays of light emitted from the light source to a side spot on the recording surface of the optical disk situated at a side spot on the information recording track on which the central portion of the rays emitted from the light source are converged by the converging lens;
   a second photodetector for receiving and detecting the peripheral portion of the rays of light which have been refracted by the refracting means and thereafter been reflected at the side spot on the recording surface of the optical disk;
   calculation means, coupled to the second photodetector, for calculating from an output of the second photodetector the amount of tilting of the recording surface of the optical disk with respect to an optical axis of the converging lens, the calculation means outputting a signal corresponding to the calculated amount of tilting of the recording surface of the optical disk; and
   an actuator, coupled to the calculation means, for adjusting, in response to the signal output from the calculation means, the attitude of the optical head device with respect to the recording surface of the optical disk so that the tilting of the recording surface with respect to the optical axis of the converging lens is adjusted.

2. An optical head device as claimed in claim 1 wherein the second photodetector comprises a pair of photodetector cells, and the signal output from the calculation means corresponds to the difference between two outputs of the photodetector cells in the pair.

3. An optical head device as claimed in claim 1 wherein the refracting means comprises a prism formed on a flange of the converging lens.

4. An optical head device as claimed in claim 1 wherein the refracting means comprises means for converging the peripheral portion of the rays refracted by the refracting means.

5. An optical head device for recording and reproducing information on a recording surface of an optical disk comprising:

a light source for rays of light;

a first diffraction grating for diffracting a central portion of the rays emitted from the light source, to resolve the rays into a plurality of pencils of rays;

a converging lens for converging along an information track on the recording surface of the optical disk the plurality of pencils of rays into which a central portion of the rays emitted from the light source is resolved by the first diffraction grating, wherein the pencils of rays converged on the recording surface of the optical disk are reflected therefrom to form reflected pencils of rays;

a beam splitter for separating the reflected pencils of rays reflected from the recording surface of the optical disk from the pencils of rays into which the central portion of the rays emitted from the light source is resolved;

a first photodetector for receiving and detecting the reflected pencils of rays that have been converged by the converging lens and thereafter have been separated by the beam splitter from the emitted rays, thereby reproducing information recorded on the information track on the optical disk and detecting a tracking error;

a second diffraction grating formed integrally with the first diffraction grating at a side thereof, for diffracting a peripheral portion of the rays emitted from the light source to deflect it and direct it via the converging lens on a side spot on the recording surface of the optical disk that is situated at a side of the spots along the information track on which the pencils of rays are converged by the converging lens;

a second photodetector for receiving and detecting the peripheral portion of the rays of light which has been diffracted by the second diffraction grating and thereafter has been reflected at the recording surface of the optical disk;

calculation means, coupled to the second photodetector, for calculating from an output of the second photodetector the amount of tilting of the recording surface of the optical disk with respect to an optical axis of the converging lens, the calculation means outputting a signal corresponding to the calculated amount of tilting of the recording surface of the optical disk; and an actuator coupled to the calculation means, for adjusting, in response to the signal output from the calculation means, the attitude of the optical head device with respect to the recording surface of the optical disk so that the tilting of the recording surface with respect to the optical axis of the converging lens is adjusted.

6. An optical head device as claimed in claim 5 wherein the second photodetector comprises a pair of photodetector cells, and the signal output from the calculation means corresponds to the difference between two outputs of the photodetector cells in the pair.

7. An optical head device as claimed in claim 5 wherein the second diffraction grating comprises: a diffraction grating having a grating interval which gradually varies, and adjustment means for adjusting the position of the diffraction grating in a direction of grating interval variation.

8. An optical head device as claimed in claim 5 wherein the first and second diffraction gratings comprise diffraction gratings having a saw-tooth cross section.

9. An optical head device as claimed in claim 5 further comprising an aperture limiter for limiting an aperture of the converging lens for the pencils of rays into which the central portion of the rays emitted from the light source is resolved by the first diffraction grating.

10. An optical head device for recording and reproducing information on a recording surface of an optical disk comprising:

a light source for emitting rays of light;

a converging lens for converging a central portion of the rays emitted from the light source on an information recording track on the recording surface of the optical disk wherein rays of light converged on the recording surface of the optical disk are reflected therefrom to form reflected rays of light;

a beam splitter for separating the reflected rays of light reflected from the recording surface of the optical disk from the rays emitted from the light source;

a first photodetector for receiving and detecting the reflected rays of light that are separated by the beam splitter, thereby reproducing information recorded on the information track on the optical disk;

reflection means for reflecting a peripheral portion of the rays of light emitted from the light source, thereby deflecting and directing the peripheral portion via the converging lens, to a side spot on the recording surface of the optical disk situated at a side of a spot on the information track on which the central portion of the rays emitted from the light source is converged by the converging;

a second photodetector for receiving and detecting the peripheral portion of the rays of light which have been reflected by the reflection means and thereafter at the side spot on the recording surface of the optical disk;

calculation means, coupled to the second photodetector, for calculating from an output of the second photodetector the amount of tilting of the recording surface of the optical disk with respect to an optical axis of the converging lens, the calculation means outputting a signal corresponding to the calculated amount of tilting of the recording surface optical disk; and an actuator, coupled to the calculation means, for adjusting, in response to the signal output from the calculation means, the attitude of the optical head device with respect to the recording surface of the optical disk so that the tilting of the recording surface with respect to the optical axis of the converging lens is adjusted.

11. An optical head device as claimed in claim 10 wherein the second photodetector comprises a pair of photodetector cells, and the signal output from the calculation means corresponds to the difference between two outputs of the photodetector cells in the pair.

12. An optical head device as claimed in claim 10 wherein the second photodetector is disposed next to the first photodetector to receive the peripheral rays of light reflected from the recording surface of the optical disk via the converging lens and the beam splitter.

13. An optical head device as claimed in claim 10 wherein the second photodetector is disposed on a flange of the converging lens to directly receive the peripheral rays of light reflected at the recording surface of the optical disk.

14. An optical head device as claimed in claim 10 wherein the second photodetector is disposed on a side of the converging lens to receive the peripheral rays of light undergoing a reflective diffraction of first order at the recording surface of the optical disk.

15. An optical head as device as claimed in claim 10 further comprising an aperture limiter for limiting an aperture of the converging lens for the central portion of the rays emitted from the light source.

16. An optical head device as claimed in claim 10 wherein the second photodetector comprises a linear position detector, disposed on a substrate on which the first photodetector is disposed, for detecting the linear position of the peripheral rays of light incident thereon after being reflected at the recording surface of the optical disk, the linear position detector outputting a signal corresponding to the detected linear position of the incident rays.

17. An optical head device for recording and reproducing information on a recording surface of an optical disk comprising:
a light source for emitting rays of light;
a converging lens for converging the rays emitted from the light source on an information recording track on the recording surface of the optical disk, wherein rays of light converged on the recording surface of the optical disk are reflected therefrom to form reflected rays of light;
a beam splitter for separating from the rays emitted from the light source the reflected rays of light that are reflected at the recording surface of the optical disk and transmitted again through the converging lens;
a first photodetector for receiving and detecting the reflected rays of light that have been separated by the beam splitter, thereby reproducing information recorded on the track of the optical disk;
reflection means for reflecting a portion of the rays of light emitted from the light source which is split via the beam splitter from the portion directed to the converging lens via beam splitter, to a side spot on the recording surface of the optical disk situated at a side of a spot on the information recording track on which the central portion of the rays emitted from the light source is converged by the converging;
a second photodetector for receiving and detecting the peripheral portion of the rays of light which have been reflected from the recording surface of the optical disk;
calculation means, coupled to the second photodetector, for calculating from an output of the second photodetector the amount of tilting of the recording surface of the optical disk with respect to an optical axis of the converging lens, the calculation means outputting a signal corresponding to the calculated amount of tilting of the recording surface of the optical disk; and
an actuator, coupled to the calculation means, for adjusting, in response to the signal output from the calculation means, the attitude of the optical head device with respect to the recording surface of the optical disk so that the tilting of the recording surface with respect to the optical axis of the converging lens is adjusted.

18. An optical head device as claimed in claim 17 wherein the second photodetector comprises a pair of photodetector cells, and the signal output from the calculation means corresponds to the difference between two outputs of the photodetector cells of the pair.

19. An optical head device as claimed in claim 17 wherein the reflection means comprises a plane mirror and the optical head device further comprises a convex lens for collimating the portion of the rays reflected by the reflection means.

20. An optical head device as claimed in claim 17 wherein the reflection means comprises a concave mirror.

21. An optical head device for an optical disk comprising:
a light source that emits light;
light directing means for directing a first portion of the light from the light source onto a first spot on an information track on a recording surface of an optical disk and directing a second portion of the light from the light source onto a second spot on the recording surface separated from the first spot;
a first photodetector for detecting light reflected from the first spot on the recording surface and generating a signal indicating information stored on the information track;
a second photodetector for detecting light reflected from the second spot on the recording surface; and
angle adjusting means responsive to the second photodetector for adjusting an angle of incidence of the first portion of the light with respect to the recording surface.

22. An optical head device as claimed in claim 21 wherein the light directing means comprises a converging lens for converging the first portion of the light onto the first spot, and the angle adjusting means comprises means for adjusting an orientation of the converging lens with respect to the recording surface.

23. An optical head device as claimed in claim 22 wherein the light from the light source has a central portion and a peripheral portion adjoining the central portion, and the first portion of the light comprises the central portion and the second portion of the light comprises the peripheral portion.

24. An optical head device as claimed in claim 23 wherein the light directing means comprises a refracting means for refracting the peripheral portion of the light onto the second spot.

25. An optical head device as claimed in claim 24 wherein the converging lens has a central portion for converging light and a flange adjoining the central portion, and the refracting means comprises a prism formed on the flange.

26. An optical head device as claimed in claim 25 wherein the refracting means comprises a first prism and a second prism formed on the flange on opposite sides of the central portion of the converging lens.

27. An optical head device as claimed in claim 23 wherein the light directing means comprises:
   a first diffraction grating for diffracting the central portion of the light from the light source;
   a second diffraction grating for diffracting the peripheral portion of the light from the light source; and
   first reflecting means for reflecting light incident thereon from the first and second diffraction gratings at the converging lens, wherein the reflected light from the first diffraction grating is directed by the converging lens at the first spot and reflected light from the second diffraction grating is directed by the converging lens at the second spot.

28. An optical head device as claimed in claim 27 wherein:
   the first diffraction grating comprises gratings extending in a first direction; and
   the second diffraction grating comprises two sections disposed in the same plane as the first diffraction grating on opposite sides of the first diffraction grating and having gratings extending perpendicular to the first direction.

29. An optical head device as claimed in claim 27 wherein the second diffraction grating has a grating interval that varies in a prescribed direction, the light directing means further comprising means for moving the second diffraction grating parallel to the prescribed direction so as to vary the angle of diffraction produced by the second diffraction grating.

30. An optical head device as claimed in claim 27 wherein the first reflecting means comprises a beam splitter.

31. An optical head device as claimed in claim 23 wherein the light directing means comprises:
   first reflecting means for reflecting the peripheral portion of the light from the light source; and
   second reflecting means for reflecting the central portion of the light from the light source and the peripheral portion of the light reflected by the first reflecting means onto the converging lens, wherein the central portion of the light from the light source is directed by the converging lens at the first spot and light from the first reflecting means is directed by the converging lens at the second spot.

32. An optical head device as claimed in claim 31 wherein the second reflecting means comprises a beam splitter.

33. An optical head device as claimed in claim 31 wherein the second photodetector is disposed such that light reflected from the second spot strikes the second photodetector after passing through the converging lens.

34. An optical head device as claimed in claim 31 wherein the second photodetector is disposed such that light reflected from the second spot strikes the second photodetector without passing through the converging lens.

35. An optical head device as claimed in claim 34 wherein the converging lens has a central portion and a flange adjoining the central portion, and the second photodetector is mounted on the flange.

36. An optical head device as claimed in claim 22 wherein the light directing means comprises:
   a beam splitter disposed so as to reflect a portion of the light from the light source at the converging lens and pass a portion of the light from the light source, wherein the first portion of the light from the light source comprises the portion reflected by the beam splitter and the second portion of the light from the light source comprises the light passing through the beam splitter; and
   a reflector for reflecting the second portion of the light onto the second spot.

37. An optical head device as claimed in claim 22 wherein the light directing means comprises:
   a beam splitter disposed so as to reflect a portion of the light from the light source at the converging lens and pass a portion of the light from the light source, wherein the first portion of the light from the light source comprises the portion reflected by the beam splitter and the second portion of the light from the light source comprises the light passing through the beam splitter; and
   an optical waveguide that receives the second portion of light from the beam splitter and directs the second portion towards the second spot.

* * * * *

UNITED STATES PATENT AND TRADEMARK OFFICE
CERTIFICATE OF CORRECTION

PATENT NO. : 5,216,649

DATED : June 1, 1993

INVENTOR(S) : Koike et al.

It is certified that error appears in the above-identified patent and that said Letters Patent is hereby corrected as shown below:

Claim 1, col. 18, line 17, change "devise" to --device--.

Claim 10, col. 20, line 58, after "face" insert --of the--.

Claim 17, col. 21, line 53, after "via" insert --the--.

Signed and Sealed this

Eleventh Day of January, 1994

Attest:

BRUCE LEHMAN

Attesting Officer          Commissioner of Patents and Trademarks